(12) United States Patent
Ryu

(10) Patent No.: US 8,736,975 B2
(45) Date of Patent: May 27, 2014

(54) MACRO LENS SYSTEM AND IMAGE PICKUP DEVICE INCLUDING THE SAME

(75) Inventor: Jae-myung Ryu, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 87 days.

(21) Appl. No.: 13/089,475

(22) Filed: Apr. 19, 2011

(65) Prior Publication Data
US 2012/0075719 A1    Mar. 29, 2012

(30) Foreign Application Priority Data

Sep. 27, 2010  (KR) .................. 10-2010-0093291

(51) Int. Cl.
*G02B 15/22* (2006.01)
*G02B 9/12* (2006.01)
(52) U.S. Cl.
USPC .......................................... 359/693; 359/784

(58) Field of Classification Search
USPC .................. 359/693, 695, 740, 784
See application file for complete search history.

(56) References Cited

FOREIGN PATENT DOCUMENTS

| JP | 62-227111 A | 10/1987 |
|---|---|---|
| JP | 06-308386 A | 4/1994 |
| JP | 07-152001 A | 6/1995 |
| JP | 07-294853 A | 11/1995 |
| JP | 10-003034 A | 1/1998 |
| JP | 2003-161877 A | 6/2003 |
| JP | 2003-279849 A | 10/2003 |
| JP | 2005-189727 A | 7/2005 |
| JP | 2007-271752 A | 10/2007 |

*Primary Examiner* — Alicia M Harrington
(74) *Attorney, Agent, or Firm* — Drinker Biddle & Reath LLP

(57) ABSTRACT

Provided are a macro lens system and an image pickup device including the macro lens system. The macro lens system includes a first lens group having a positive refractive power, a second lens group having a positive refractive power, and a 3-1 lens group having a positive refractive power and moving perpendicular to an optical axis to correct an image blur.

20 Claims, 35 Drawing Sheets

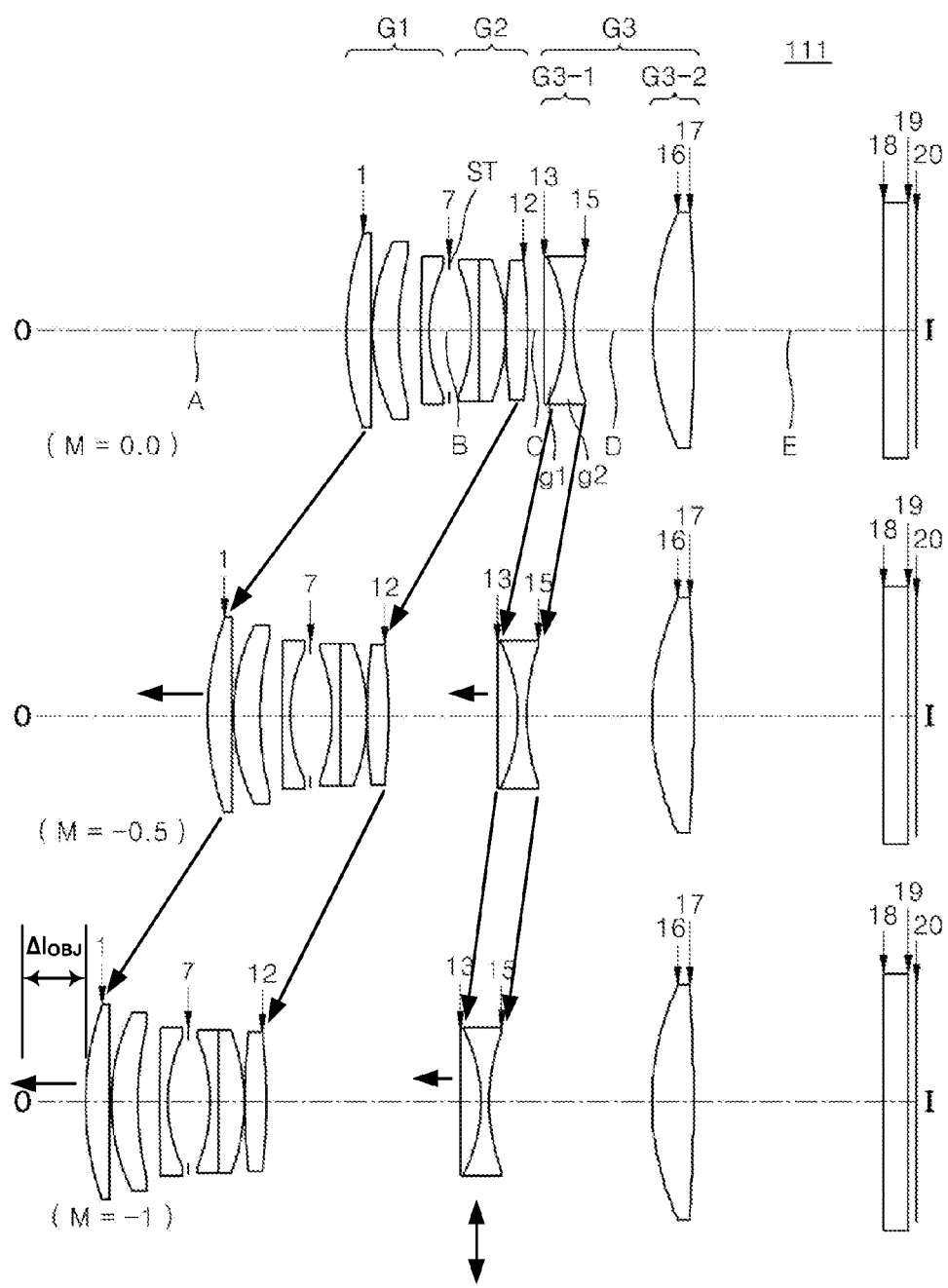

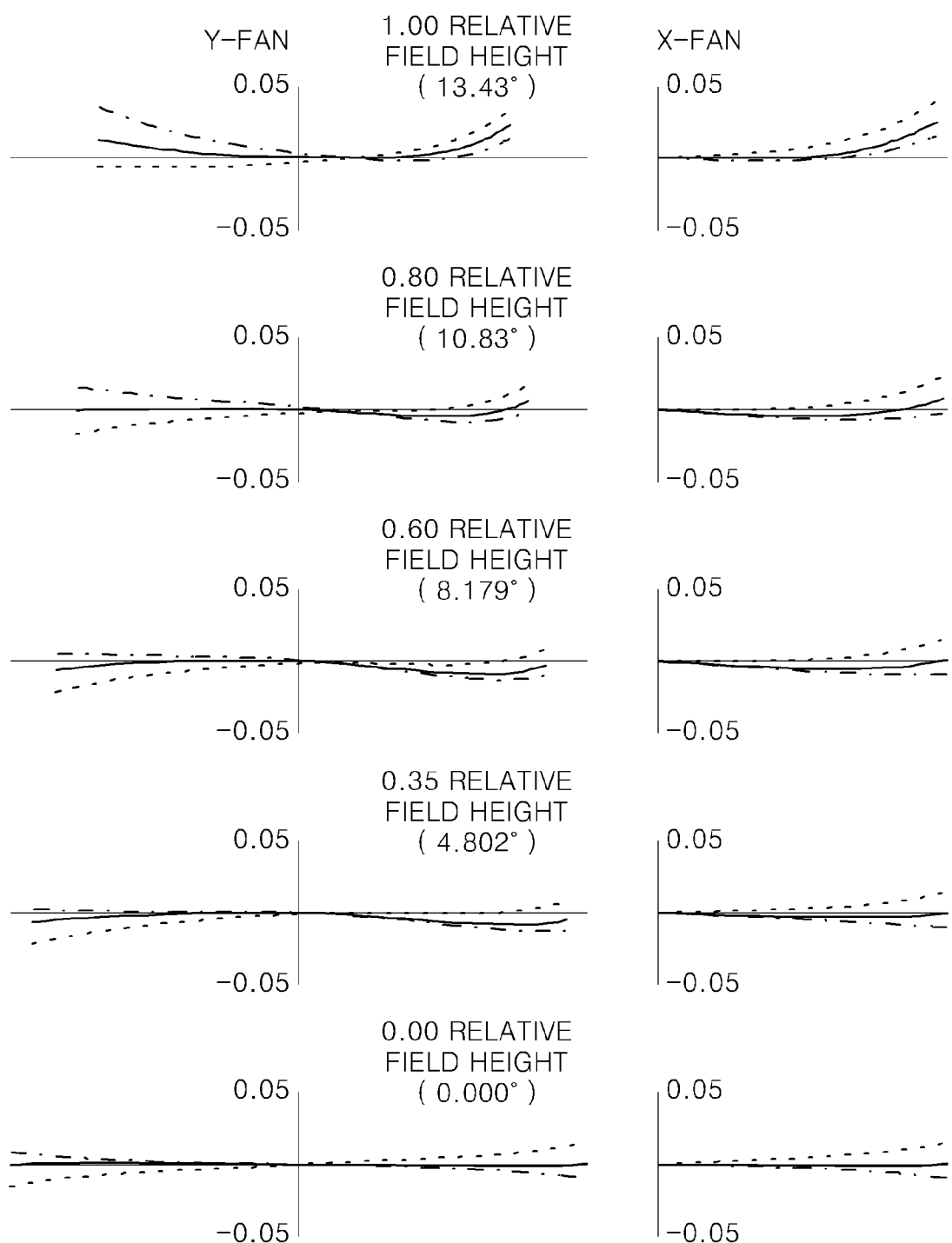

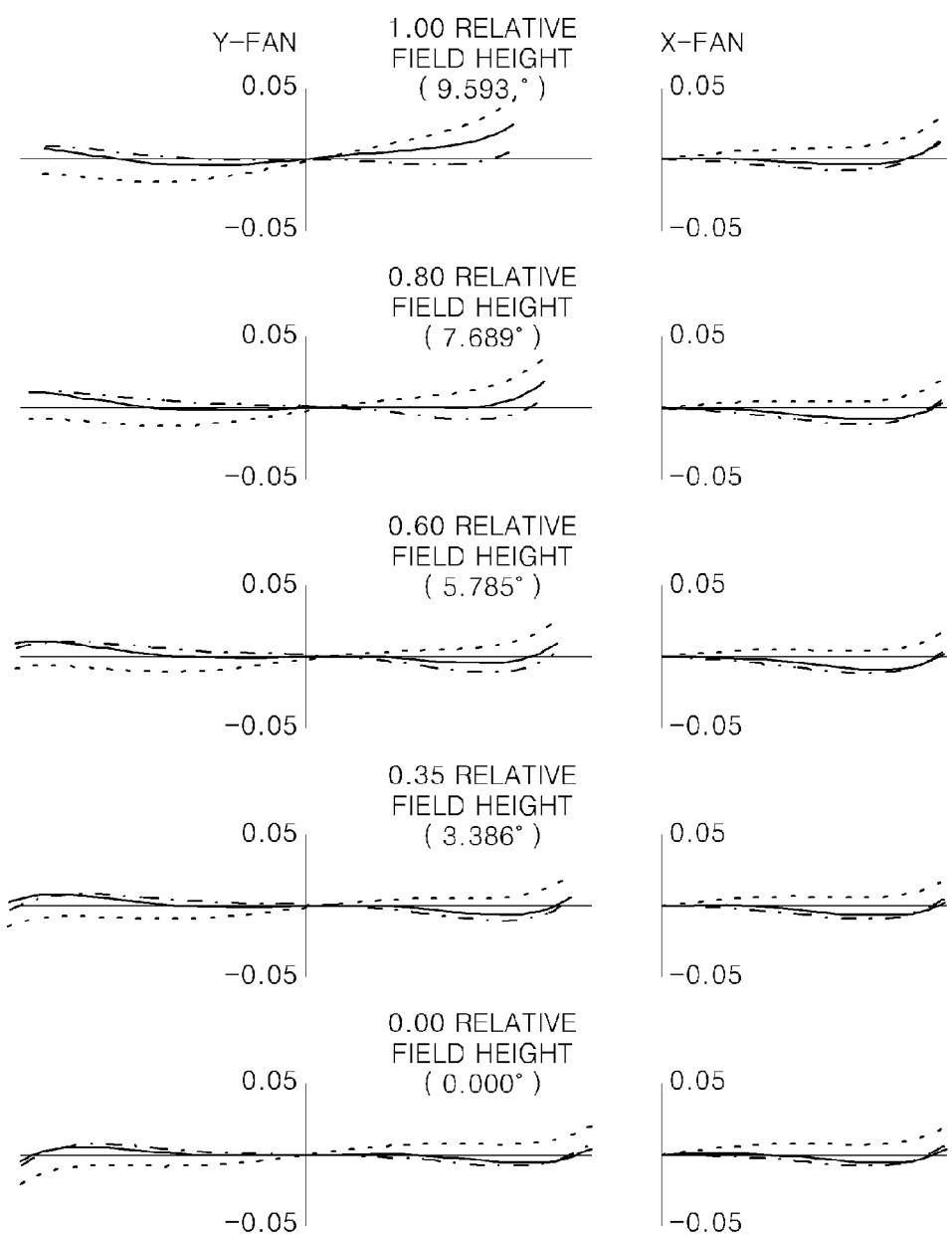

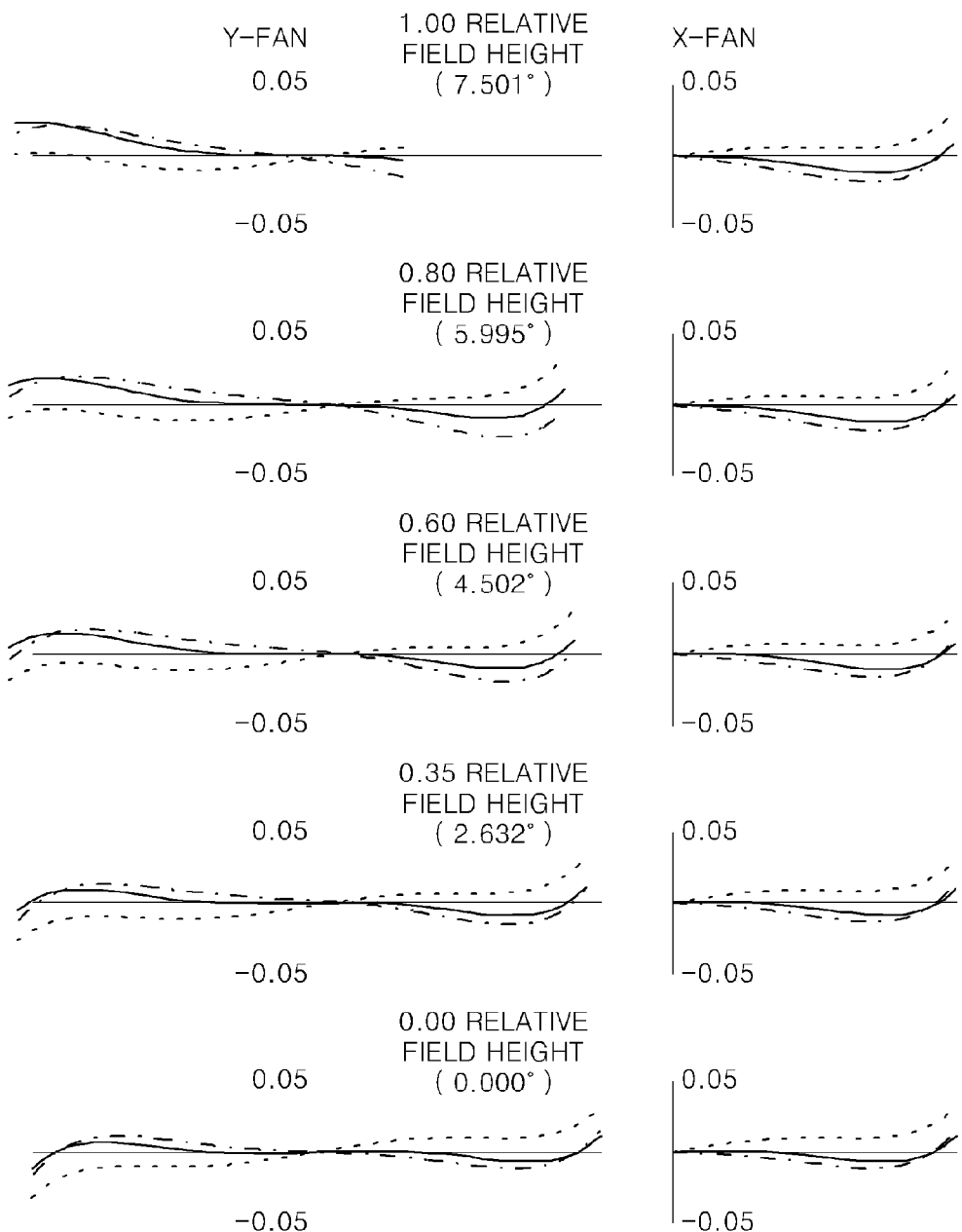

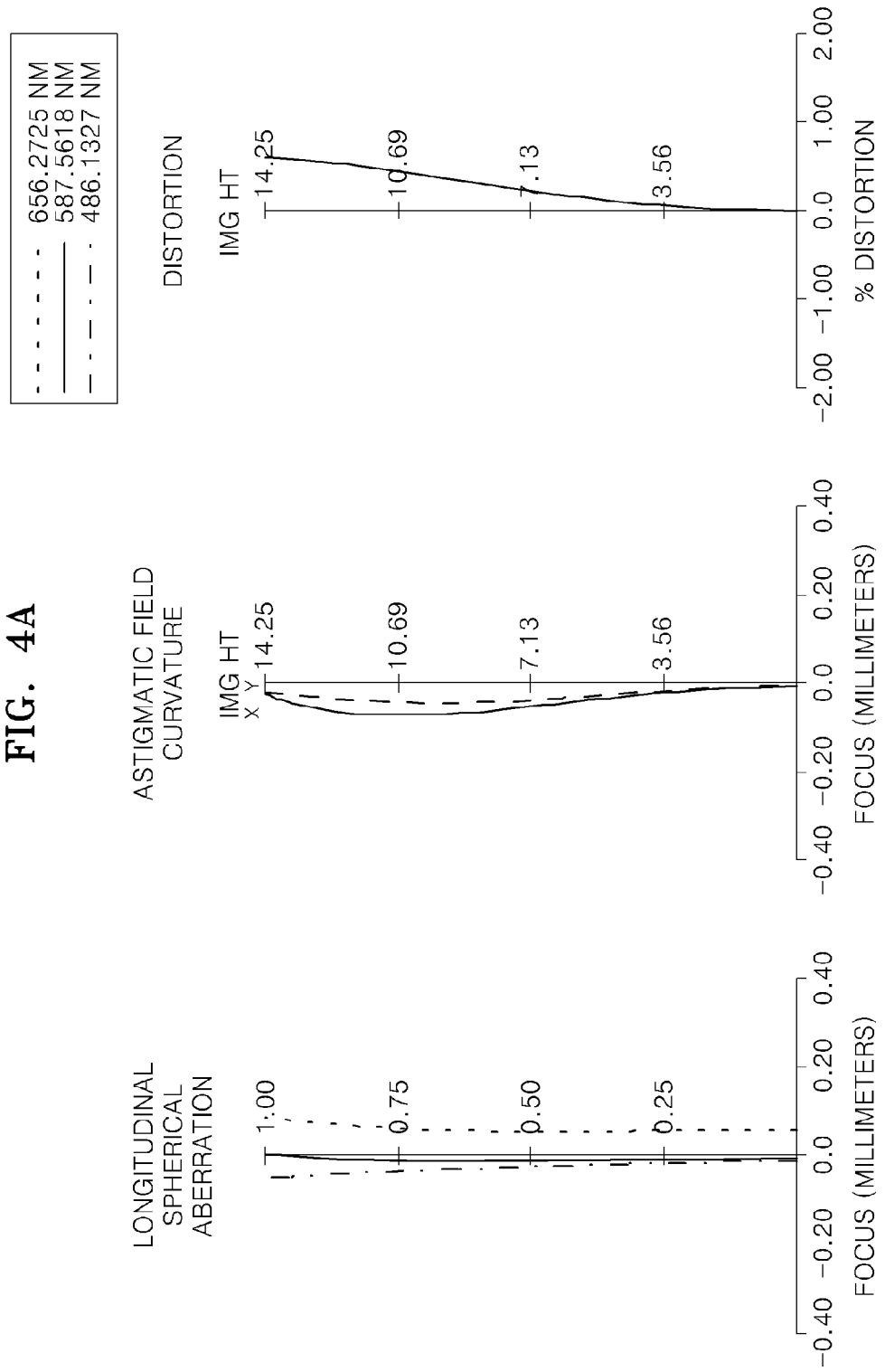

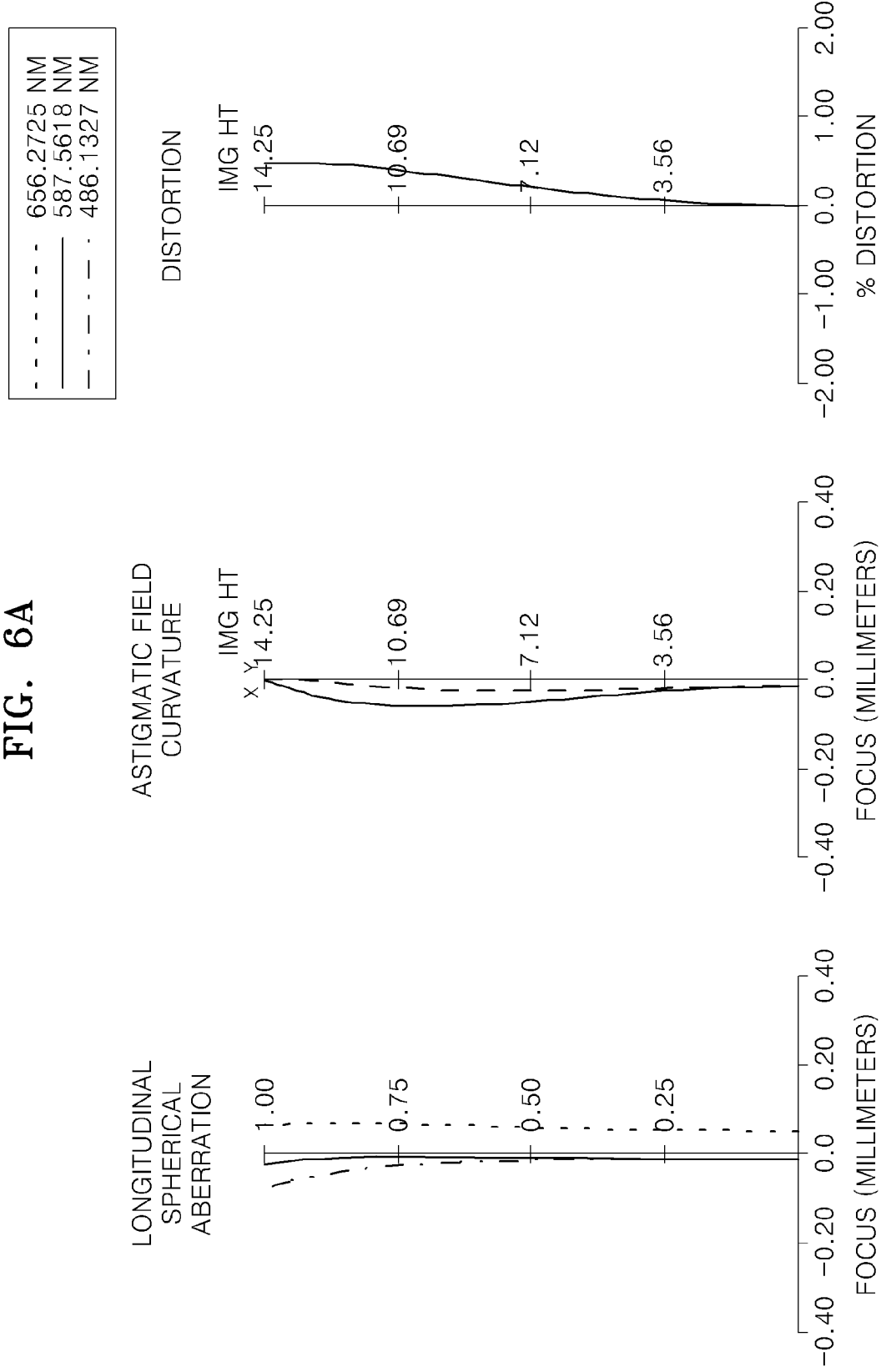

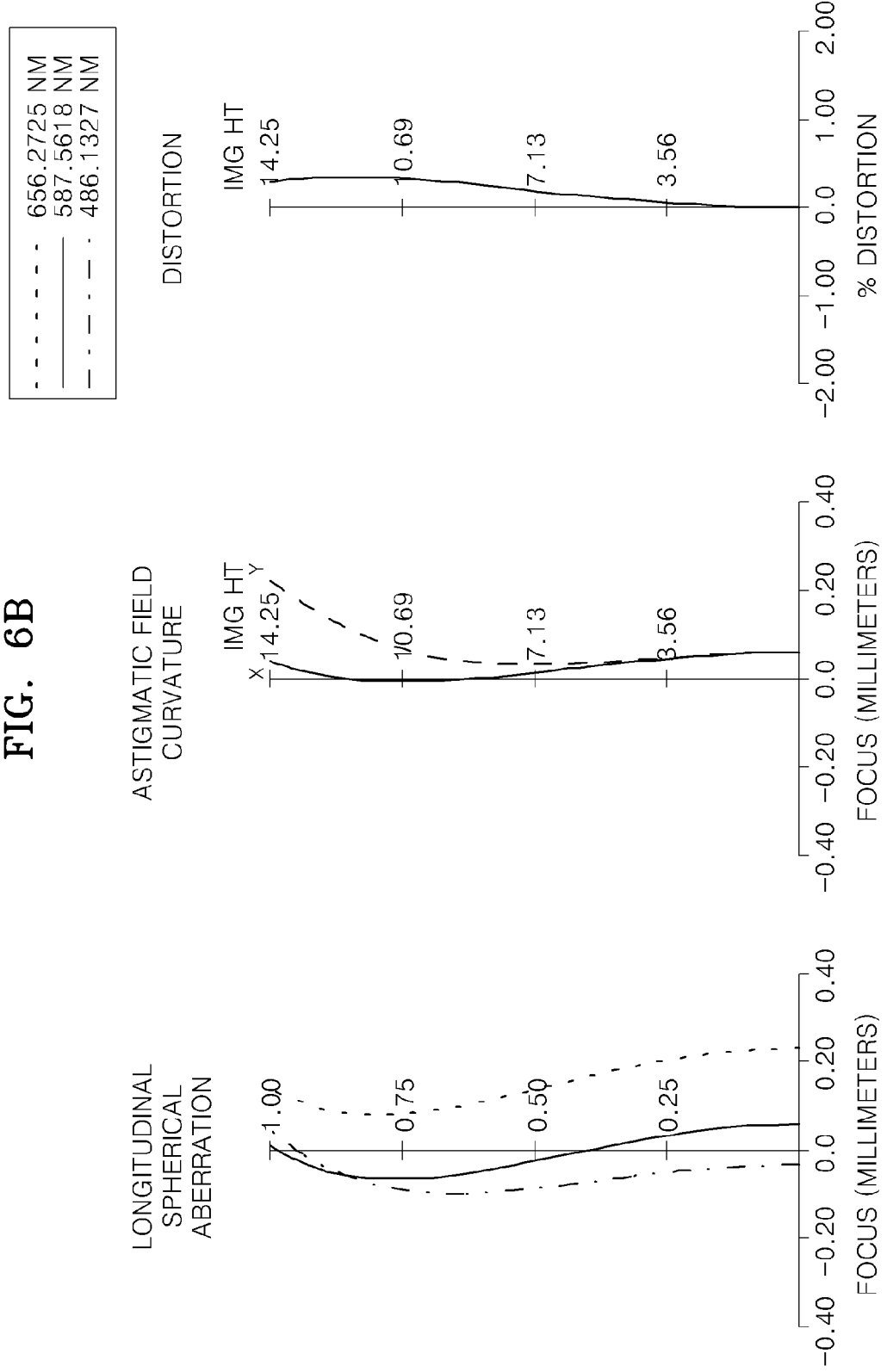

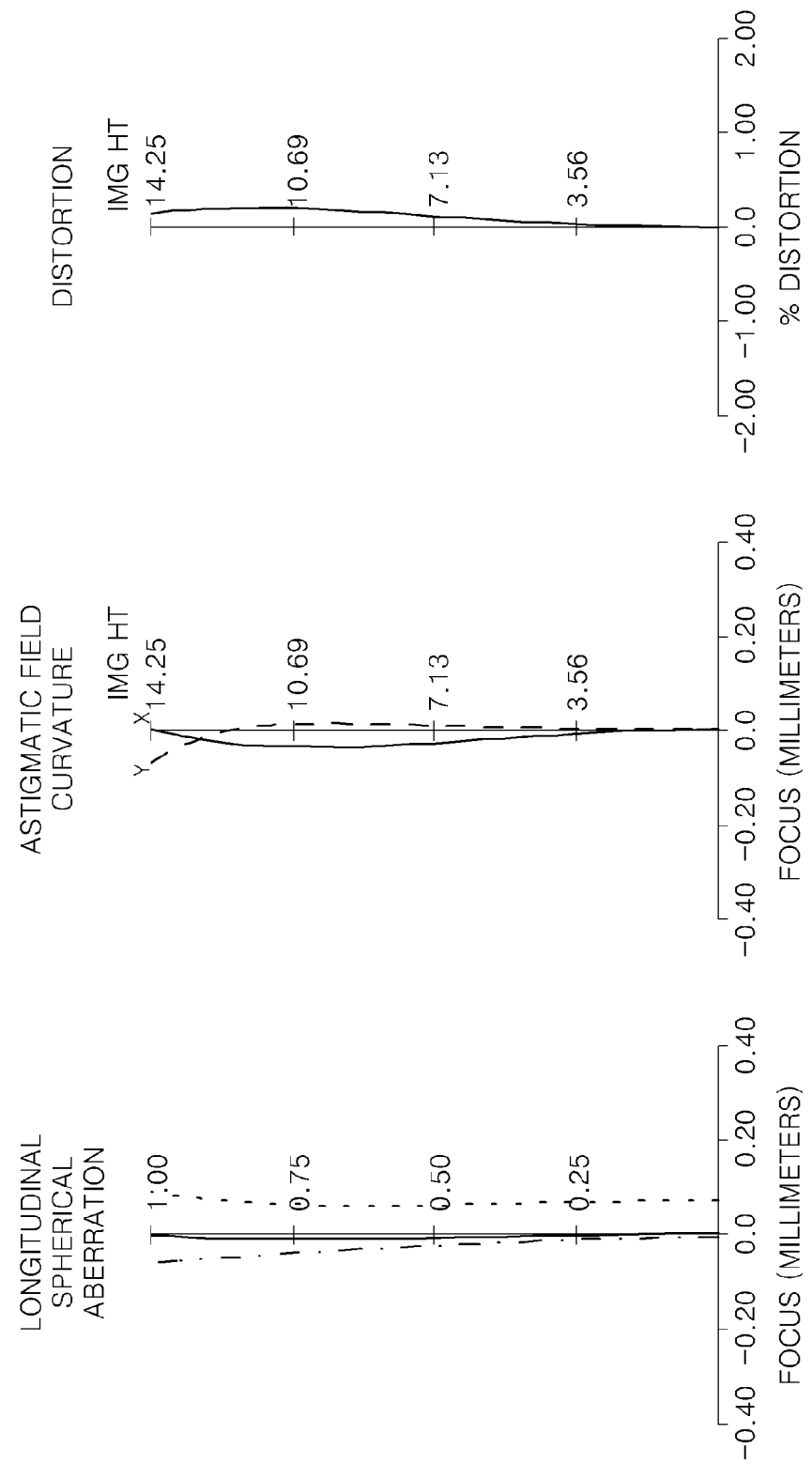

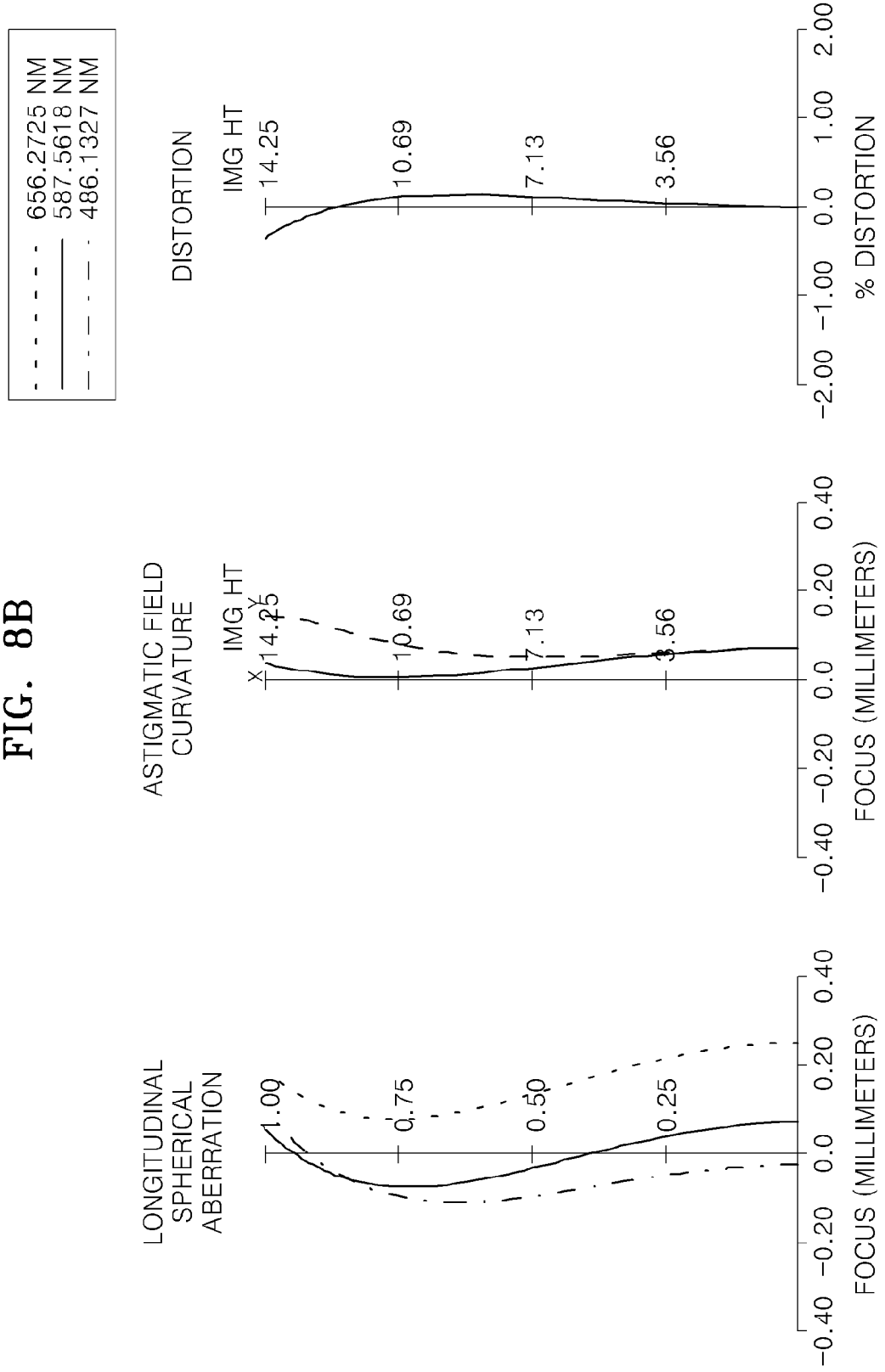

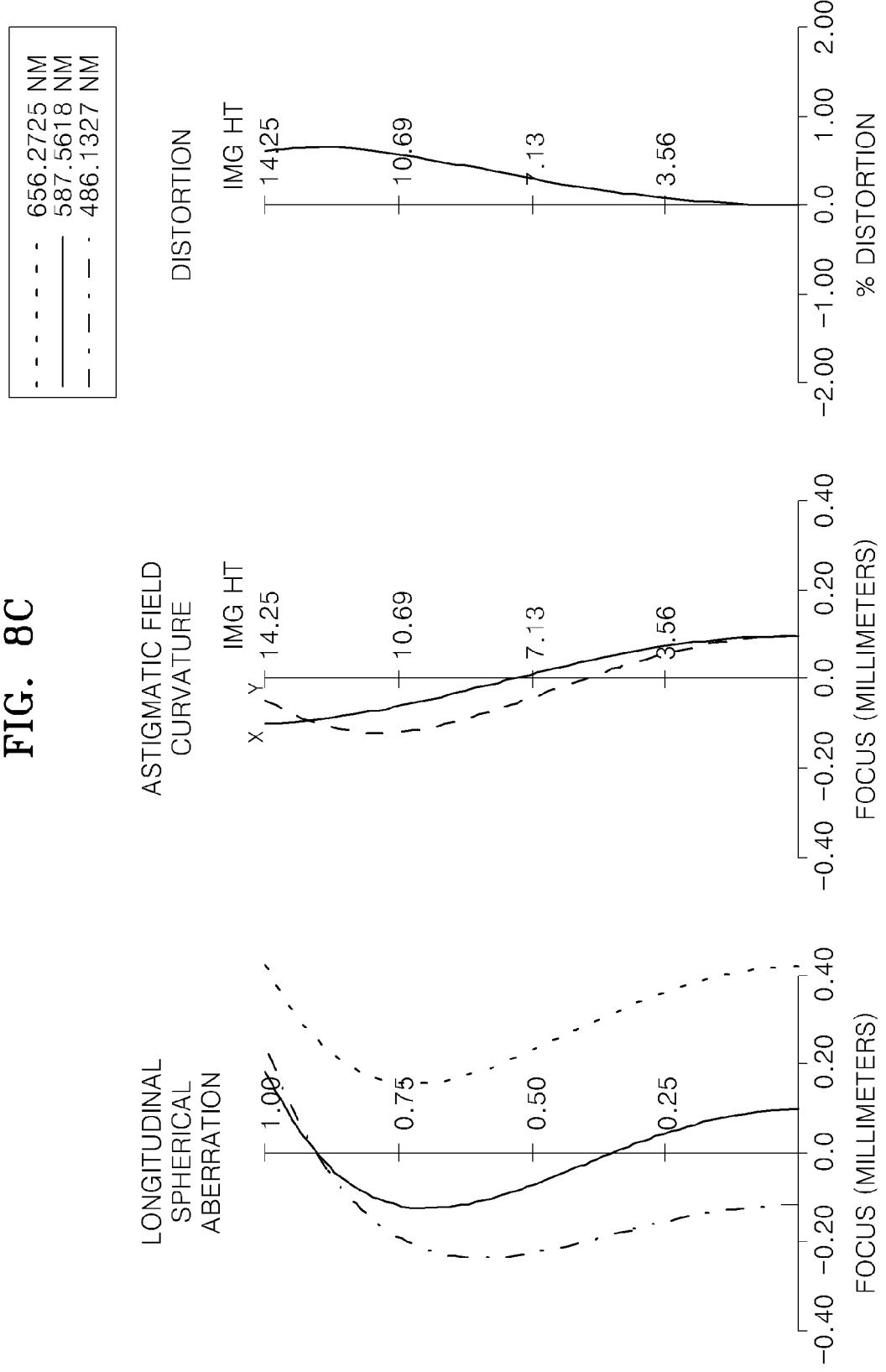

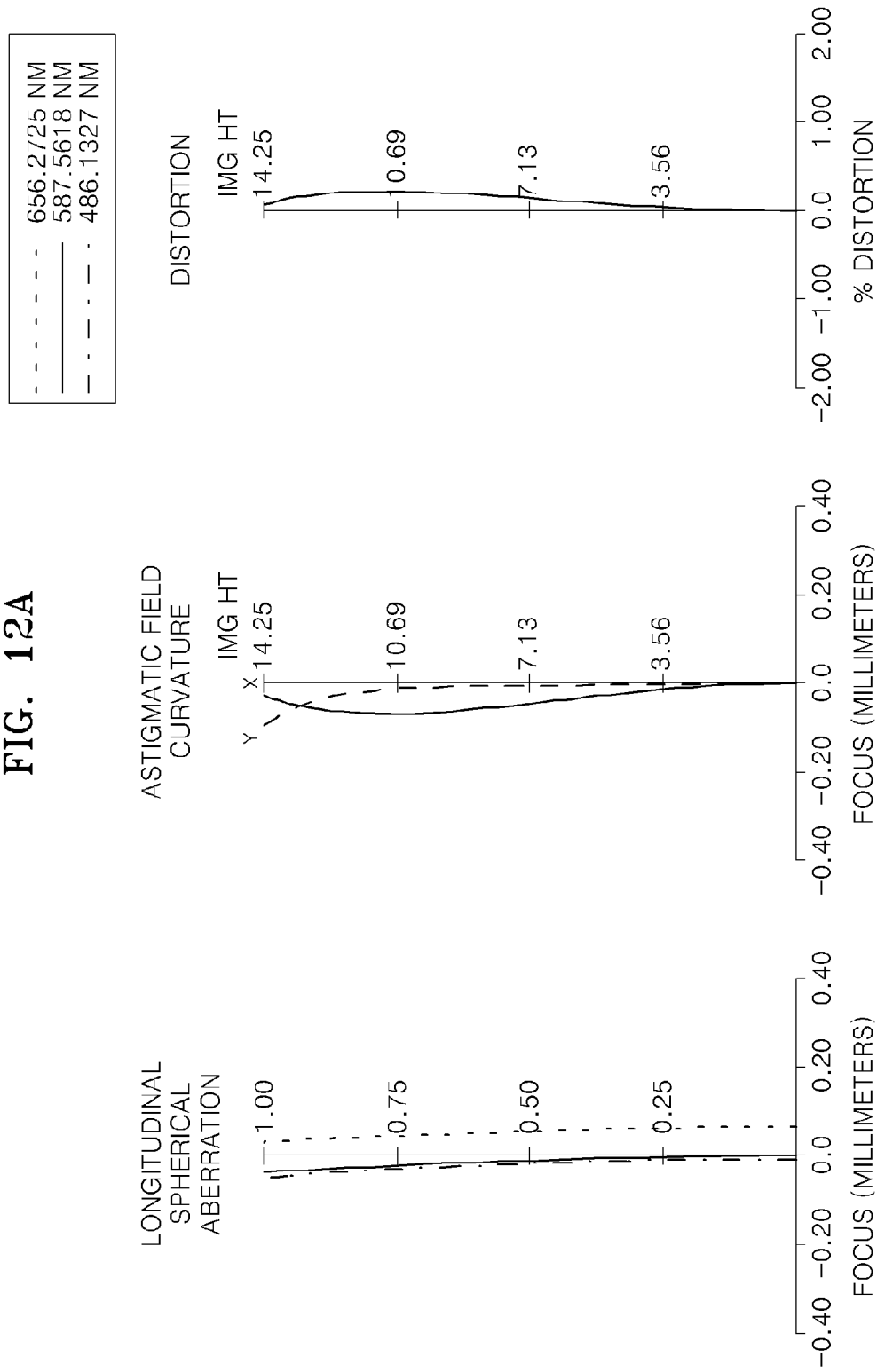

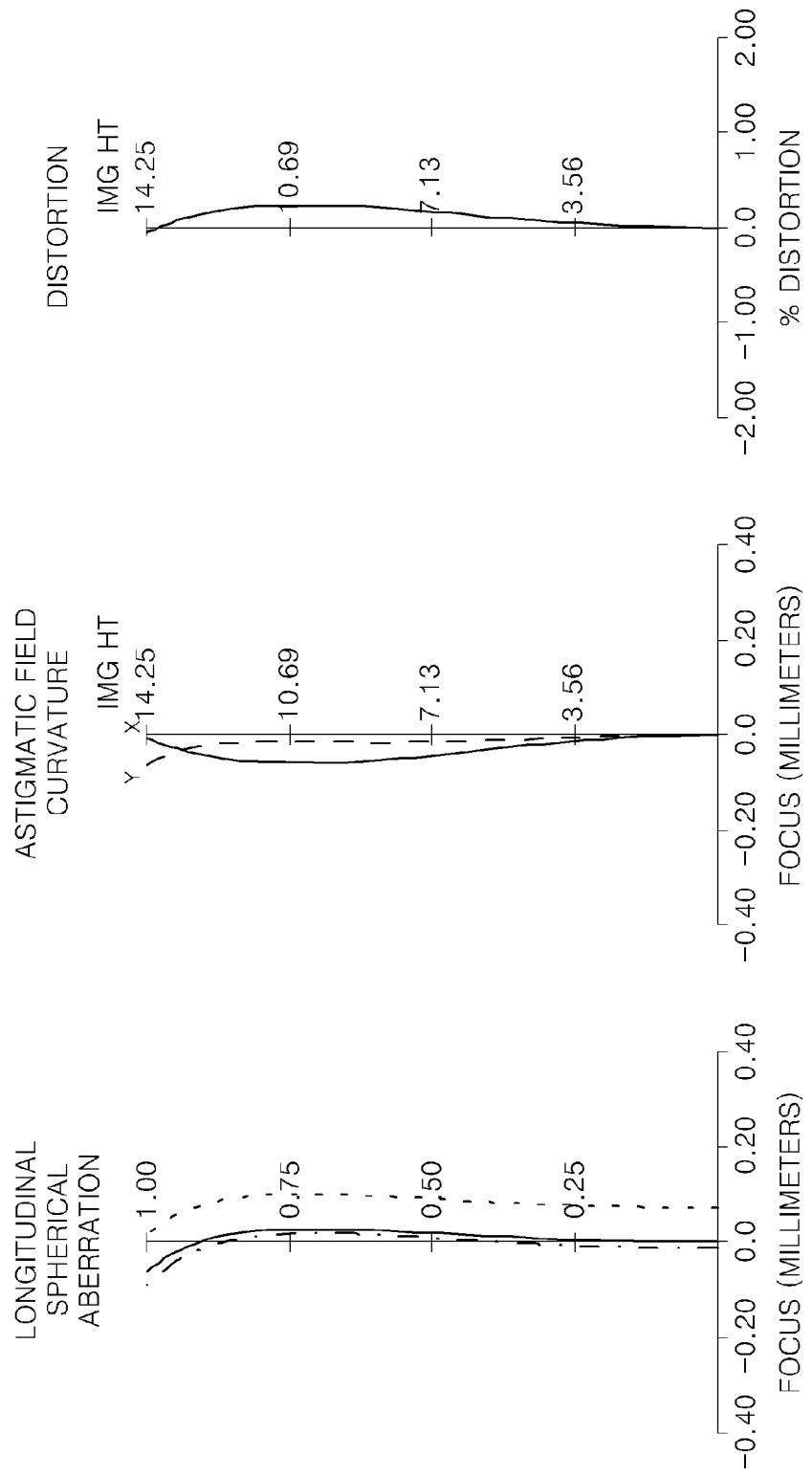

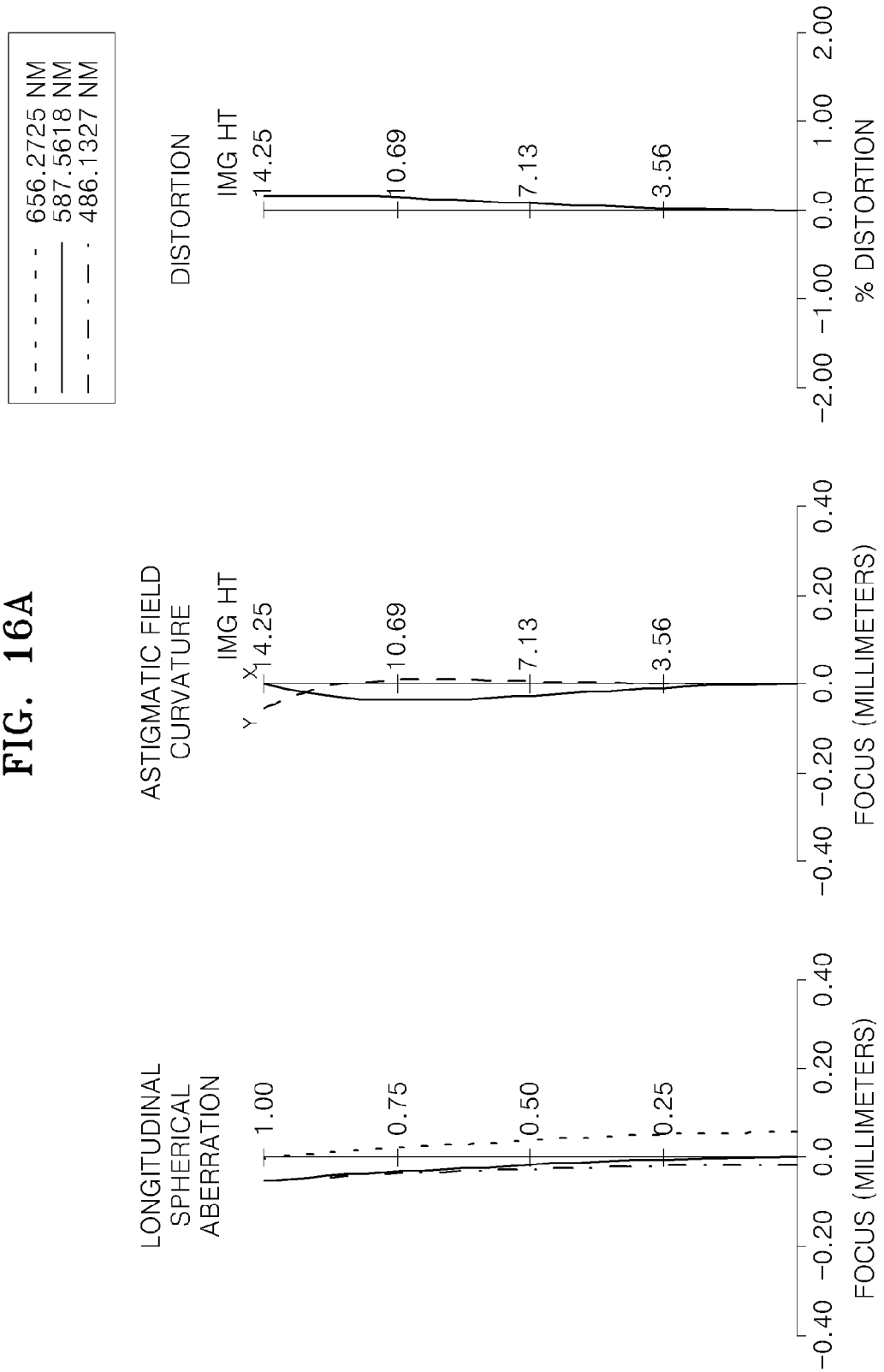

MACRO LENS SYSTEM AND IMAGE PICKUP DEVICE INCLUDING THE SAME

CROSS-REFERENCE TO RELATED PATENT APPLICATION

This application claims the benefit of Korean Patent Application No. 10-2010-0093291, filed on Sep. 27, 2010, in the Korean Intellectual Property Office, the entire disclosure of which is incorporated herein by reference.

BACKGROUND

1. Field

Embodiments of the invention relate to a lens system capable of correcting image blur and performing a macro-photographing operation and an image pickup device including the lens system.

2. Description of the Related Art

Consumer demand for single lens reflex (SLR) cameras has increased, and in particular consumer demand for digital SLR cameras has increased. Digital SLR cameras often use a charged-coupled device (CCD) or a complementary metal-oxide semiconductor (CMOS). Consumer demand for high-end digital SLR cameras with lenses having various functions is strong. For example, consumer demand for digital SLRs with macro lens systems is strong, but many macro lens systems do not perform well enough to satisfy consumers of high-end digital cameras.

SUMMARY

Therefore, there is a need in the art for a macro lens system including: a stop; a first lens group located in front of the stop, and having a positive refractive power; a second lens group located behind the stop, and having a positive refractive power; a 3-1 lens group located behind the second lens group, having a positive refractive power, and configured to move in a direction perpendicular to an optical axis to correct an image blur; and a 3-2 lens group having a positive refractive power for correcting a residual aberration, wherein at least one of the following is configured to change during a focusing operation: a distance between the second lens group and the 3-1 lens group and a distance between the 3-1 lens group and the 3-2 lens group, and the macro lens system satisfies the following equation, $$2.5 \le \left|\frac{\Delta I_{OBJ}}{f_{OIS}}\right| \le 10$$

where, $\Delta I_{OBJ}$ denotes a distance from a side surface of a lens that is closest to an object, to the object when the lens system is in a maximum magnification of the object position, and $f_{OIS}$ denotes a distance the first lens group is moved during a focusing operation from an infinity focus position to the maximum magnification of the object position, and wherein the term lens group is used to indicate one or more lenses, and wherein the lens is one lens of the first lens group.

The first lens group and the second lens group may simultaneously move, the 3-1 lens group may move, and the 3-2 lens group may not move during focusing.

The first lens group and the second lens group may simultaneously move, the 3-2 lens group may move, and the 3-1 lens group may not move during focusing.

The first lens group and the second lens group may independently move from each other and the 3-1 lens group may not move during focusing.

The 3-1 lens group may include a first lens and a second lens.

The first lens may have a convex surface toward an image side, and the second lens may have a double-concave shape.

The first lens and the second lens may be cemented to each other in the 3-1 lens group.

The 3-2 lens group may include one lens.

A maximum magnification of the macro lens system may be within a range of −0.5 to −1.

A magnification of the macro lens system may be within a range of 0 to −1.

According to another aspect of the inventive concept, there is provided an image pickup device including: a macro lens system; and an imaging sensor for receiving an image focused by the macro lens system, wherein the macro lens system includes: a stop; a first lens group located in front of the stop, and having a positive refractive power; a second lens group located behind the stop, and having a positive refractive power; a 3-1 lens group located behind the second lens group, having a positive refractive power, and movable in a direction perpendicular to an optical axis to correct an image blur; and a 3-2 lens group having a positive refractive power for correcting a residual aberration, wherein a distance between the second lens group and the 3-1 lens group or a distance between the 3-1 lens group and the 3-2 lens group is changed during a focusing operation, and the macro lens system satisfies following equation, $$2.5 \le \left|\frac{\Delta I_{OBJ}}{f_{OIS}}\right| \le 10$$

where, $\Delta I_{OBJ}$ denotes a distance from a side surface of a lens that is closest to an object side to an object at a maximum magnification, and $f_{OIS}$ denotes a moving amount of the first lens group during focusing from infinity to the maximum magnification.

BRIEF DESCRIPTION OF THE DRAWINGS

The above and other features and advantages of the inventive concept will become more apparent by describing in detail exemplary embodiments thereof with reference to the attached drawings in which:

FIG. 1 is a diagram showing a macro lens system according to an embodiment of the invention;

FIGS. 2A, 2B, and 2C are diagrams showing lateral aberrations of the macro lens system shown in FIG. 1;

FIGS. 4A, 4B, and 4C are diagrams showing longitudinal aberrations of the macro lens system of FIG. 1;

FIGS. 6A, 6B, and 6C are diagrams showing longitudinal aberrations of the macro lens system of FIG. 5;

FIGS. 8A, 8B, and 8C are diagrams showing longitudinal aberrations of the macro lens system of FIG. 7;

FIGS. 12A, 12B, and 12C are diagrams showing longitudinal aberrations of the macro lens system of FIG. 11;

FIGS. 14A, 14B, and 14C are diagrams showing longitudinal aberrations of the macro lens system of FIG. 13;

FIGS. 16A, 16B, and 16C are diagrams showing longitudinal aberrations of the macro lens system of FIG. 15.

DETAILED DESCRIPTION

Figure 3A:
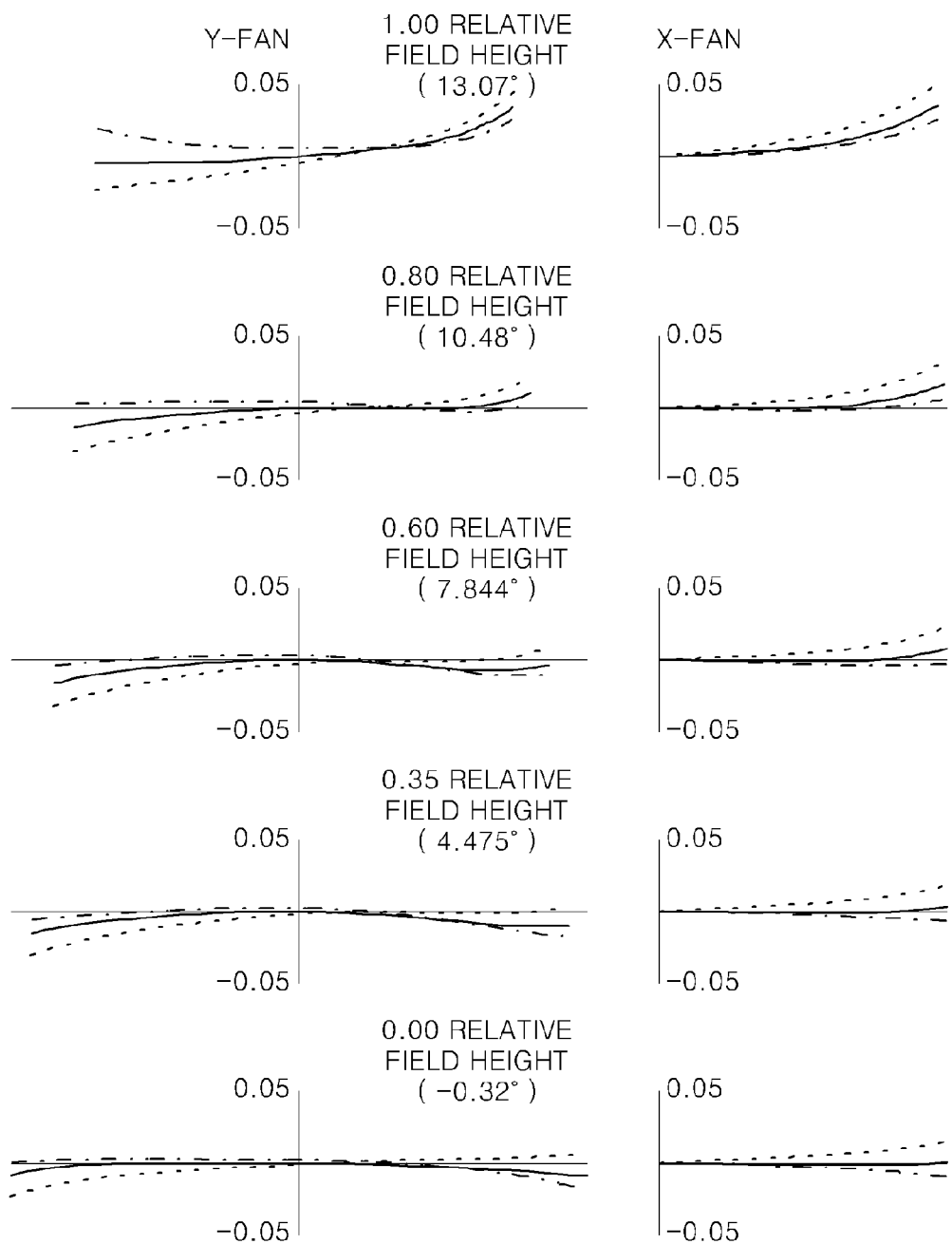
FIGS. 3A, 3B, and 3C are diagrams showing lateral aberrations in the macro lens system of FIG. 1 during correction of an image blur.

The invention will now be described more fully with reference to the accompanying drawings, in which exemplary embodiments of the invention are shown. In the drawings, the thicknesses of surfaces and regions may be exaggerated for clarity. Like reference numerals in the drawings denote like elements, and thus description thereof will not be repeated.

Referring to FIG. 1, a macro lens system 111 according to an embodiment of the invention includes a stop ST, a first lens group G1 located in front of the stop ST and having a positive refractive power, a second lens group G2 located behind the stop ST and having a positive refractive power, a 3-1 lens group G3-1 located behind the second lens group G2 and having a positive or negative refractive power, and a 3-2 lens group G3-2 having a positive refractive power. The macro lens system 111 according to the current embodiment is a lens system having a relatively small F number so as to perform a macro-photographing operation. The macro lens system 111 may appropriately distribute the refractive powers of the lens groups so as to have a relatively large aperture with a relatively small F number while using a relatively small number of lenses. In addition, the macro lens system 111 may include an image blur correcting group so as to maintain optical performances of the macro lens system 111 even when there is an image blur.

The 3-1 lens group G3-1 may move in a direction perpendicular to an optical axis direction to correct an image blur. The macro lens system 111 may be a double-gauss type macro lens system, in which lenses are symmetric with each other based on a stop. The double-gauss type lens system is advantageous in minimizing field curvature and distortion. Here, in the general double-gauss type lens system, the first lens group G1 in front of the stop and the second lens group G2 behind the stop each has a positive refractive power. Thus, if the image blur correcting group is located right behind the stop, a light beam is converged by the first lens group G1 located in front of the image blur correcting group, and thus, an aperture of the image blur correcting group may be relatively small. The above condition may be advantageous for making the image blur correcting group be relatively light weight. In addition, an additional lens may be disposed behind the image blur correcting group in order to correct residual aberrations such as field curvature, and thereby improving the optical performances of the macro lens system 111.

The macro lens system 111 may be used to photograph people or scenes at infinity, and at this time, an image blur correction may be performed by using the 3-1 lens group G3-1 in order to reduce a degradation of the optical performances of the macro lens system 111. The 3-1 lens group G3-1 for correcting an image blur may be disposed at a location where the aperture thereof may be reduced so as to be relatively light weight, and may include a relatively small number of lenses. In addition, a moving amount of the 3-1 lens group G3-1 for correcting an image blur may be reduced so as to reduce a load of a driving unit for moving the 3-1 lens group G3-1.

The 3-1 lens group G3-1 may be disposed behind a lens group having a positive refractive power so that the 3-1 lens group G3-1 may be disposed at a location where the aperture may be reduced. Therefore, the 3-1 lens group G3-1, that is, the image blur correcting group, may be disposed behind the second lens group G2 having a positive refractive power. Since the second lens group G2 has a positive refractive power so that a light beam may be converged, the aperture of the 3-1 lens group G3-1 may be reduced when behind the second lens group G2. Therefore, lenses of the 3-1 lens group G3-1, which is located behind the second lens group G2, may have smaller apertures than those of the second lens group G2.

The greater the number of lenses in the 3-1 lens group G3-1, the higher the optical performances of the macro lens system 111. However, when the number of lenses in the 3-1 lens group G3-1 is relatively great, it is difficult to configure a mechanism for moving the 3-1 lens group G3-1. Therefore, the number of lenses in the 3-1 lens group G3-1 may be reduced provided that the optical performances of the macro lens system 111 are maintained. For example, the 3-1 lens group G3-1 may include a first lens g1 and a second lens g2. The first lens g1 may have a convex surface facing an image I side, and the second lens g2 may be a double-concave lens. The first and second lenses g1 and g2 may be cemented to each other. As described above, the 3-1 lens group G3-1 including two lenses may correct color aberration.

On the other hand, the 3-2 lens group G3-2 may include one lens in order to contribute to reducing a size of the macro lens system 111.

Figure 5:
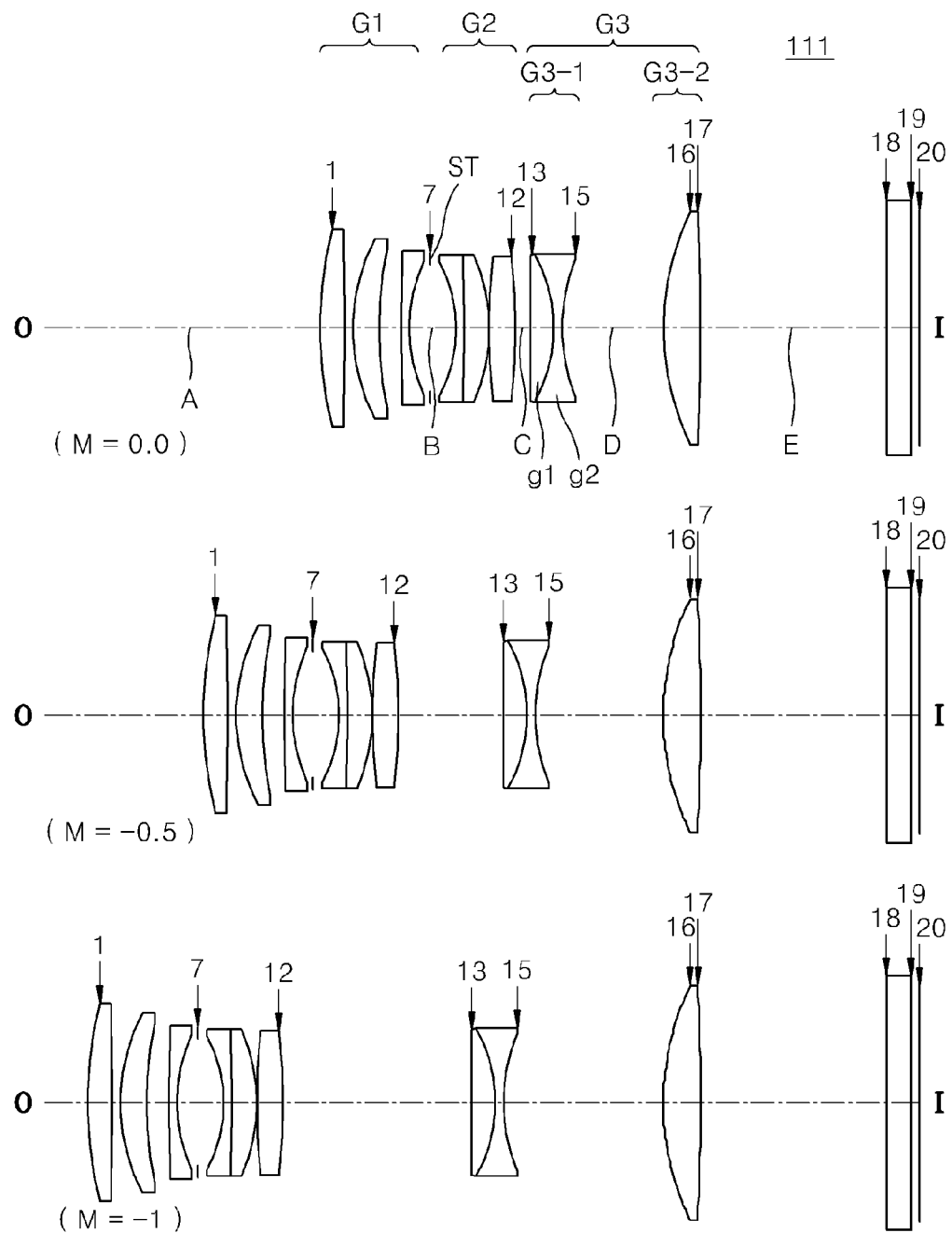
FIG. 5 is a diagram showing a macro lens system according to another embodiment of the invention.

According to the macro lens system 111 of the current embodiment, a mechanism for moving the lens groups may be simplified by moving only some of the lens groups when performing a focusing operation. For example, when performing a focusing operation, as shown in FIGS. 1 and 5, the first lens group G1, the second lens group G2, and the 3-1 lens group G3-1 may be moved, and the 3-2 lens group G3-2 may not be moved. The first and second lens groups G1 and G2 are moved together, and the 3-1 lens group G3-1 may move independently. The moving amounts of the first and second lens groups G1 and G2 may be the same. Since the 3-1 lens group G3-1, that is, the image blur correcting group, is moved in the optical axis direction when performing a focusing operation, field curvature caused by the focusing operation may be corrected.

Figure 7:
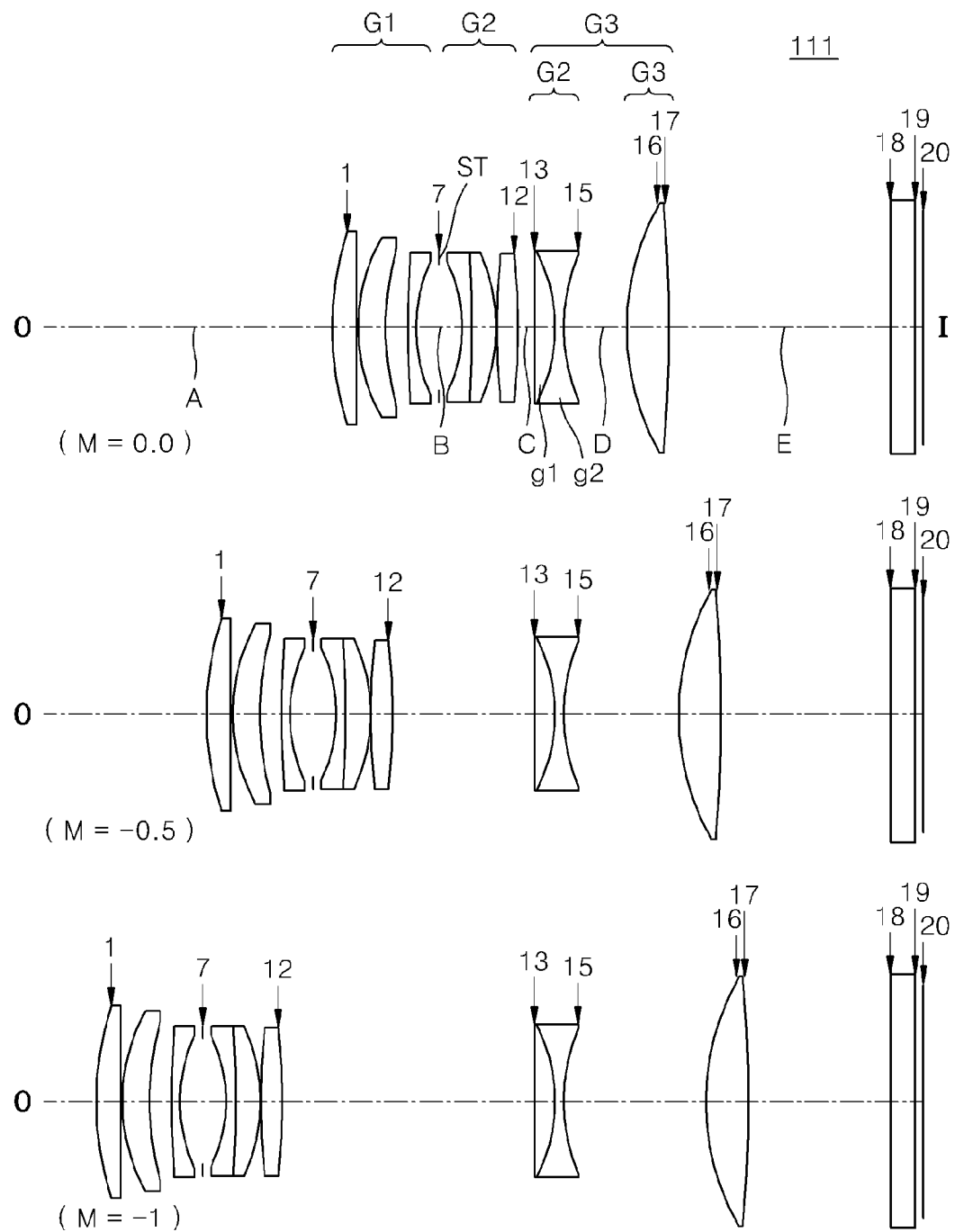
FIG. 7 is a diagram showing a macro lens system according to another embodiment of the invention.
Figure 9:
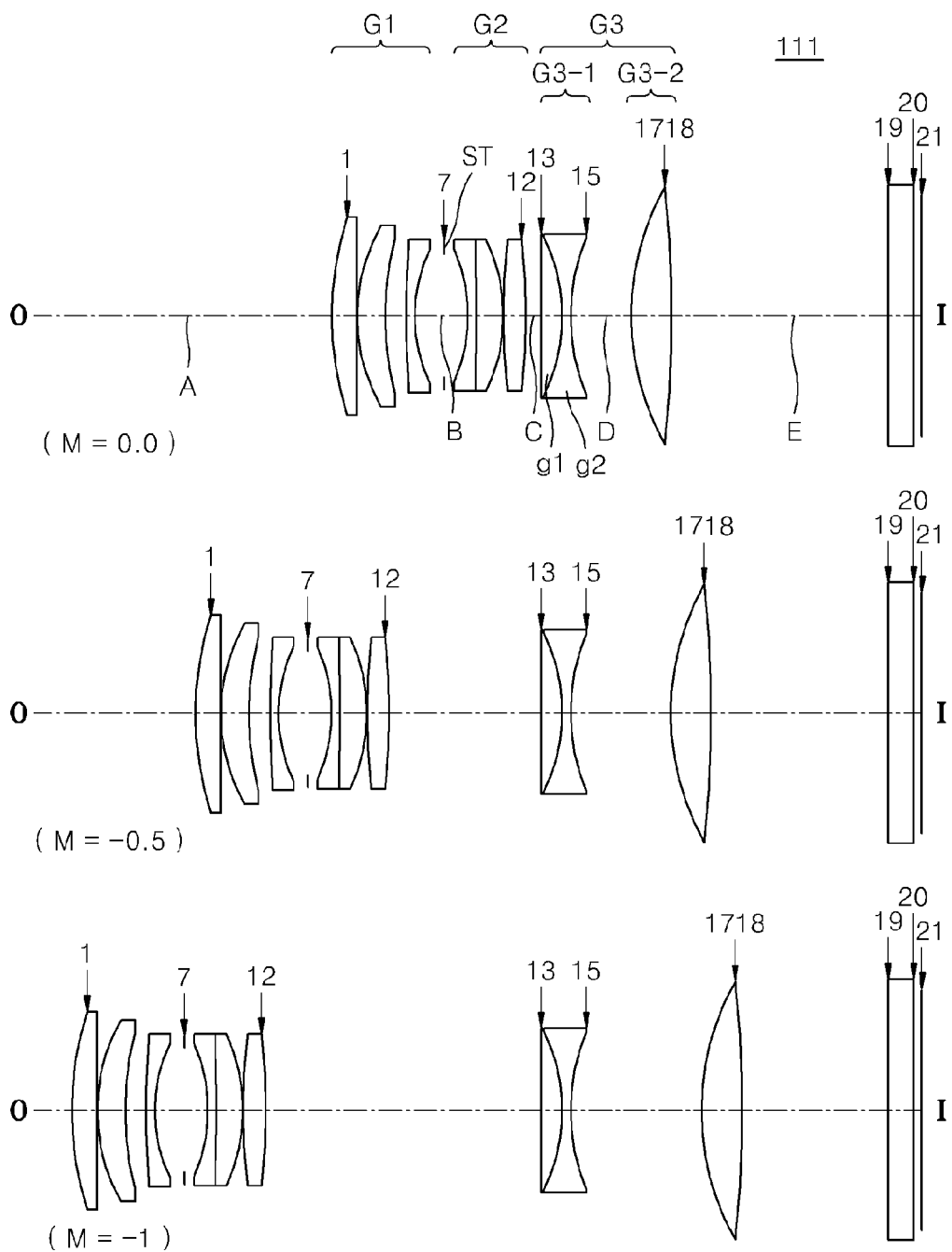
FIG. 9 is a diagram showing a macro lens system according to another embodiment of the invention.

According to another example, when a focusing operation is performed, as shown in FIGS. 7 and 9, the first lens group G1, the second lens group G2, and the 3-2 lens group G3-2 may be moved, and the 3-1 lens group G3-1 may not be moved. As described above, since the second lens group G2 and the 3-2 lens group G3-2 are respectively located in front of and behind the 3-1 lens group G3-1, variations in field curvature caused by the focusing operation may be reduced. Since the image blur correcting group is not moved, it is easy to configure the mechanism of the image blur correcting group.

Figure 11:
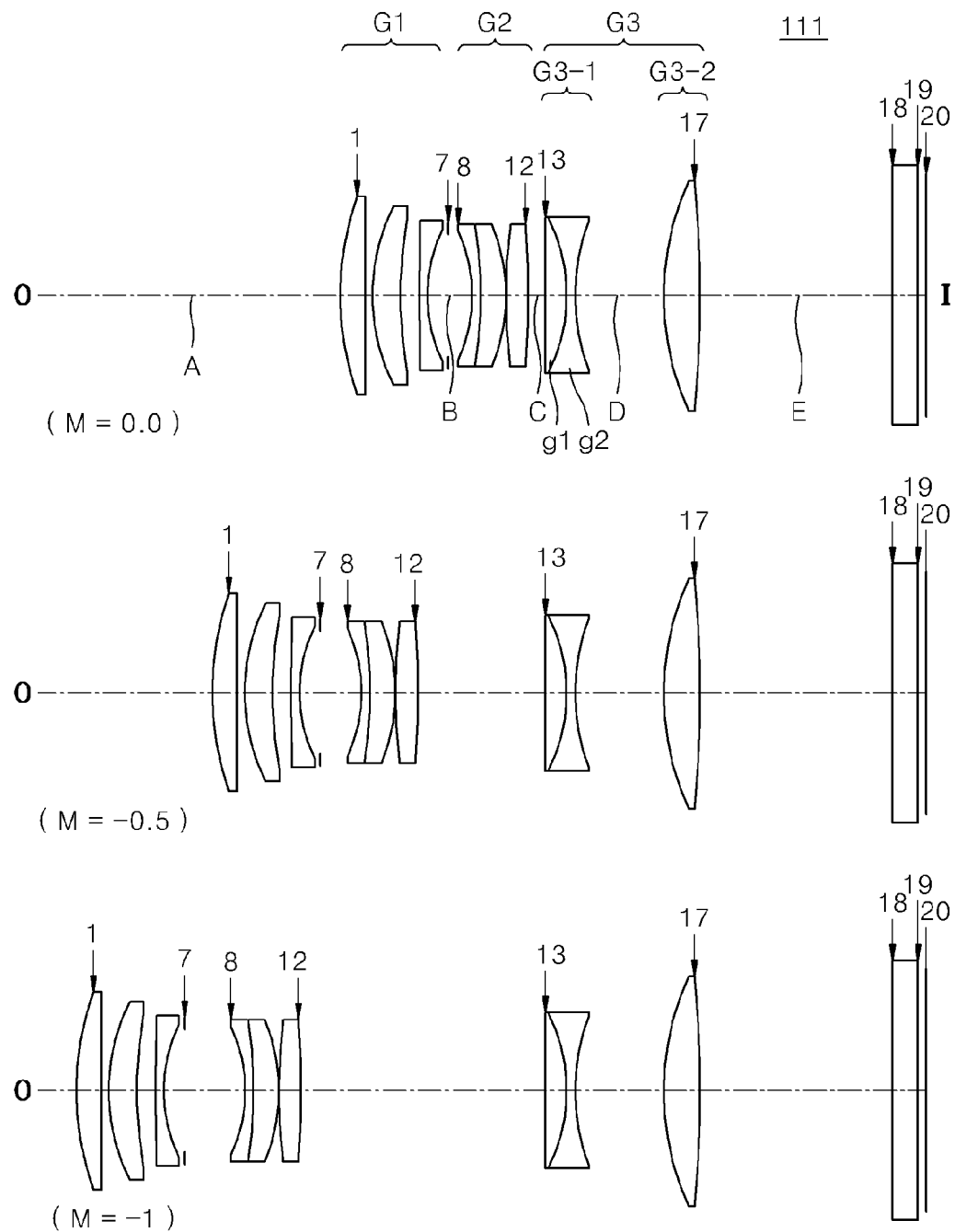
FIG. 11 is a diagram showing a macro lens system according to another embodiment of the invention.
Figure 13:
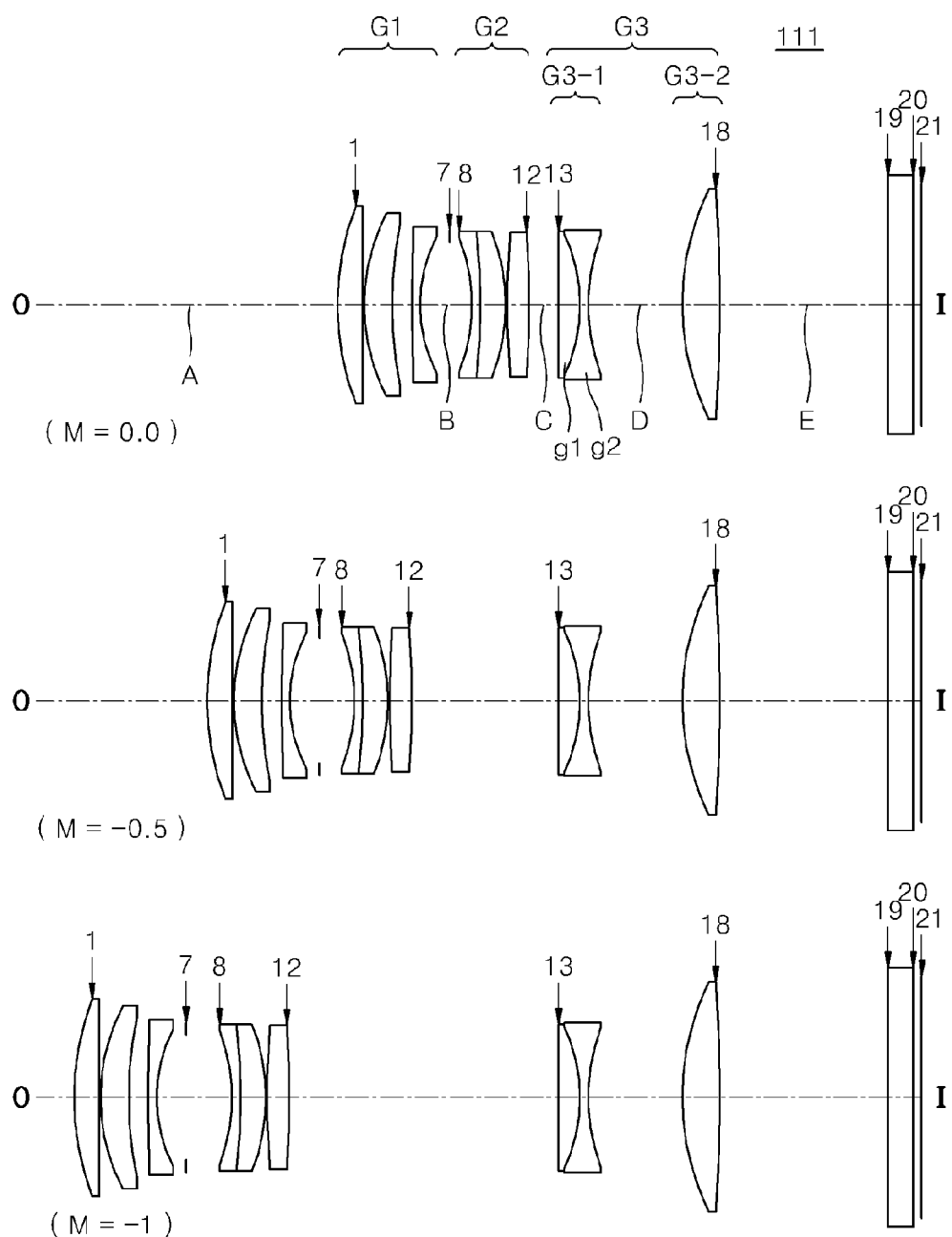
FIG. 13 is a diagram showing a macro lens system according to another embodiment of the invention.
Figure 15:
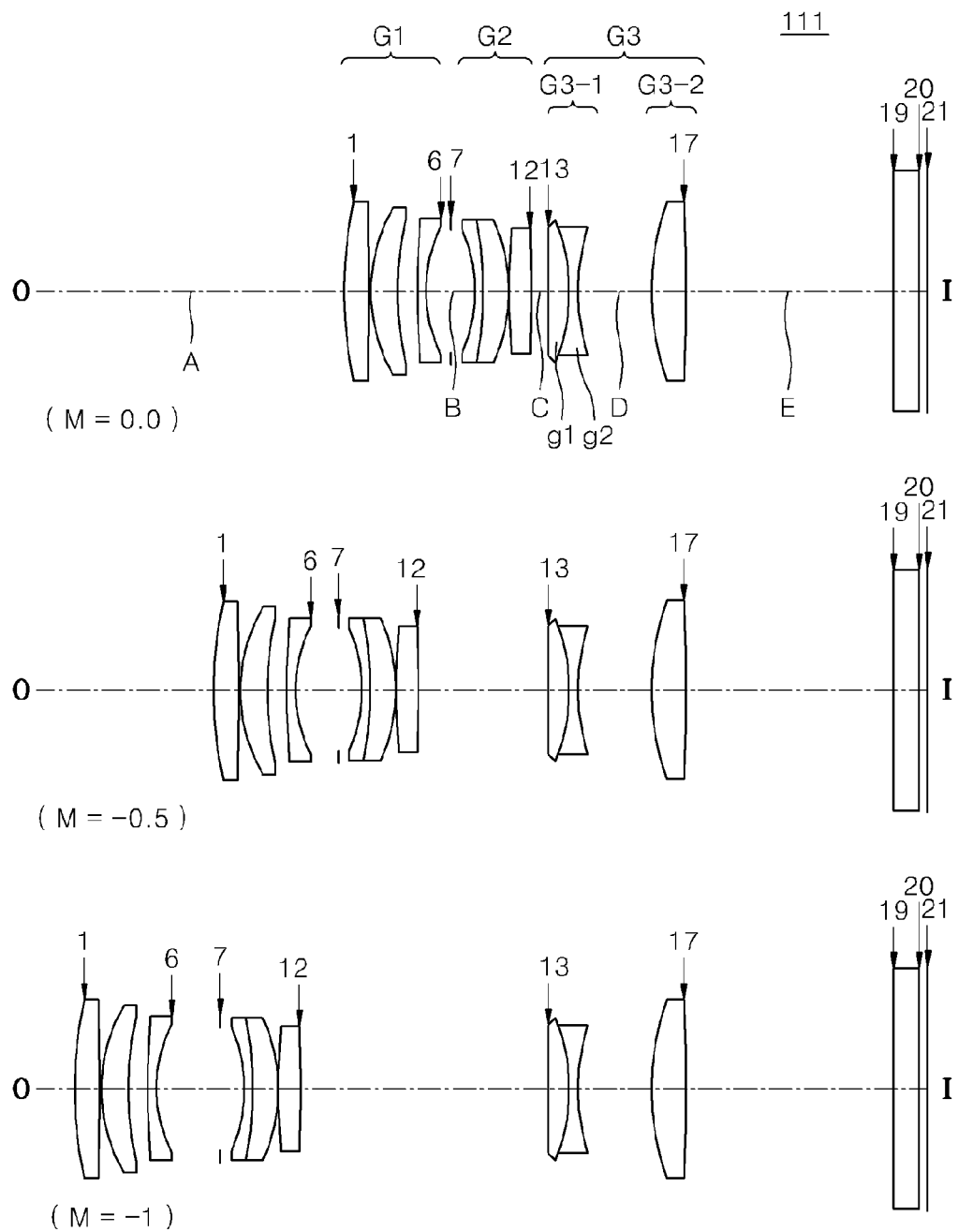
FIG. 15 is a diagram showing a macro lens system according to another embodiment of the invention.

According to another example, as shown in FIGS. 11, 13, and 15, the first lens group G1 and the second lens group G2 may be moved, and the 3-1 lens group G3-1 and the 3-2 lens group G3-2 may not be moved when performing a focusing operation. When the 3-1 lens group G3-1 and the 3-2 lens group G3-2 are not moved during a focusing operation, apertures of the lenses in a third lens group G3 may be reduced and the size of the macro lens system 111 may be relatively small. In addition, when the 3-1 lens group G3-1 is not moved during a focusing operation, the mechanism for moving the 3-1 lens group G3-1 for correcting an image blur may be simplified, and variation of field curvature caused by the focusing operation may be reduced.

The first lens group G1 may be disposed in front of the stop ST, and the second lens group G2 may be disposed behind the stop ST. The first and second lens groups G1 and G2 may each have a positive refractive power. In addition, the first lens group G1 and the second lens group G2 may have similar focal lengths so as to satisfy the symmetric condition described above, and thus, distortion may be reduced.

The macro lens system 111 according to the current embodiment may satisfy Equation 1 shown below.

$$2.5 \leq \left| \frac{\Delta l_{OBJ}}{f_{OIS}} \right| \leq 10, \quad \text{Equation (1)}$$

where, $\Delta l_{OBJ}$ denotes a distance from an object side surface of a lens that is closest to an object O side to an object at a maximum magnification, and $f_{OIS}$ denotes a moving amount of the first lens group G1 during focusing from infinity to the maximum magnification. Equation 1 is about a distance to the object at the maximum magnification. It is relatively easy to use the macro lens system 111 as the distance to the object at the maximum magnification, that is, the distance from a first surface of a first lens located at the object O side to a subject, is increased. On the other hand, when the focal length of the 3-1 lens group G3-1 is relatively short, the moving amount of the 3-1 lens group G3-1 for correcting an image blur may be reduced, and thus, it is easy to control the macro lens system 111. Therefore, it is advantageous when a value of $$\frac{\Delta l_{OBJ}}{f_{OIS}}$$

becomes large; however, it is not possible to increase the value infinitely in actual optical design. The macro lens system 111 suggested by the current embodiment has $\Delta l_{OBJ}$ having a value equal to or greater than 90 mm in Equation 1, and thus, a sufficient distance to an object may be ensured even when a ring strobe that is used in a macro-photographing operation is attached to the lens. In addition, since $f_{OIS}$ of the 3-1 lens group G3-1 is relatively short, an electrical load corresponding to the image blur correcting group may be reduced. Thus, if the value of $$\frac{\Delta l_{OBJ}}{f_{OIS}}$$

satisfies Equation 1, a product that is easy to use and has excellent electronic control properties may be realized.

As the number of moving lens groups increases, sufficiently high optical performances may be obtained. However, if there are too many moving lens groups, it is difficult to configure a mechanism to move the lens groups. Therefore, two or three lens groups should move during focusing operations.

In order to make the image blur correction group be light weight, a minimum number of lenses is used, and if two lenses are used, color aberration may be corrected within the image blur correcting group.

Next, data of the macro lens system 111 according to the embodiments of the invention will be described as follows. Hereinafter, f denotes an overall focal length (mm) of the macro lens system 111, F-number denotes an F number, 2ω denotes a viewing angle (degree), R denotes a radius of curvature, Dn denotes a central thickness of a lens or a distance (mm) between neighboring lenses, nd denotes a refractive index, vd denotes an Abbe number, and ST denotes a stop. In drawings showing following embodiments, a filter may be disposed to the utmost image side I.

First Embodiment

FIG. 1 shows a macro lens system according to the first embodiment when the magnification is M=0, M=−0.5, and M=−1.0.

The following table shows characteristics of the first embodiment. Note that in the table below under the column "Lens Surface" that the numbers correspond to the numbers in FIG. 1, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

| f = 59.3 mm, F - number = 2.87, 2ω = 26.87° | | | | |
|---|---|---|---|---|
| Lens surface | R | Dn | $n_d$ | $v_d$ |
| OBJECT | ∞ | A | | |
| 1 | 35.043 | 3 | 1.83481 | 42.7 |
| 2 | ∞ | 0.1 | | |
| 3 | 23.369 | 3.24 | 1.83481 | 42.7 |
| 4 | 42.453 | 2.564 | | |
| 5 | 175.557 | 1 | 1.84666 | 23.8 |
| 6 | 18 | 2.49 | | |
| STOP | ∞ | 2.686 | | |
| 8 | −19.22 | 1 | 1.67270 | 32.2 |
| 9 | −260.055 | 3 | 1.83481 | 42.7 |
| 10 | −24.45 | 0.1 | | |
| 11 | 73.931 | 2.6 | 1.83481 | 42.7 |
| 12 | −73.931 | B | | |
| 13 | ∞ | 2.48 | 1.84666 | 23.8 |
| 14 | −19.04 | 1 | 1.80610 | 33.3 |
| 15 | 24.385 | C | | |
| 16 | 33.22 | 5.0 | 1.48749 | 70.4 |
| 17 | −192.954 | D | | |
| 18 | ∞ | 3.0 | 1.51680 | 64.2 |
| 19 | ∞ | E | | |
| IMAGE | ∞ | | | |

The following table shows a variable distance when the macro lens system according to the first embodiment performs a focusing operation, where A through E are as illustrated in FIG. 1.

| Variable distance | M = 0.0 | M = −0.5 | M = 1.0 |
|---|---|---|---|
| A | ∞ | 154.6309 | 94.6100 |
| B | 2.0128 | 13.0397 | 23.2948 |
| C | 9.4842 | 15.1641 | 19.6261 |
| D | 22.8190 | 22.8190 | 22.8190 |
| E | 0.9927 | 1.0574 | 1.0924 |

Figure 3B:
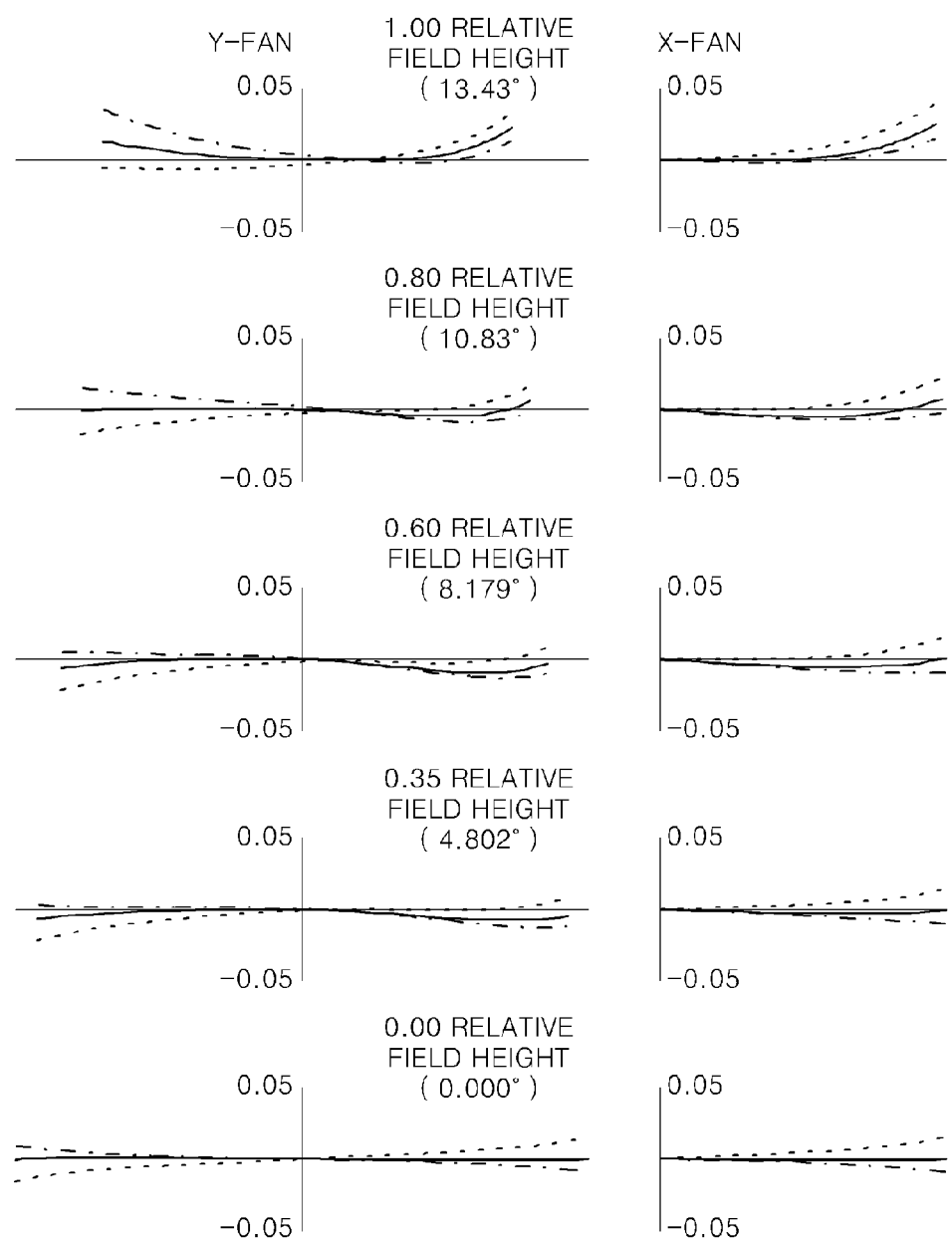
Figure 3C:
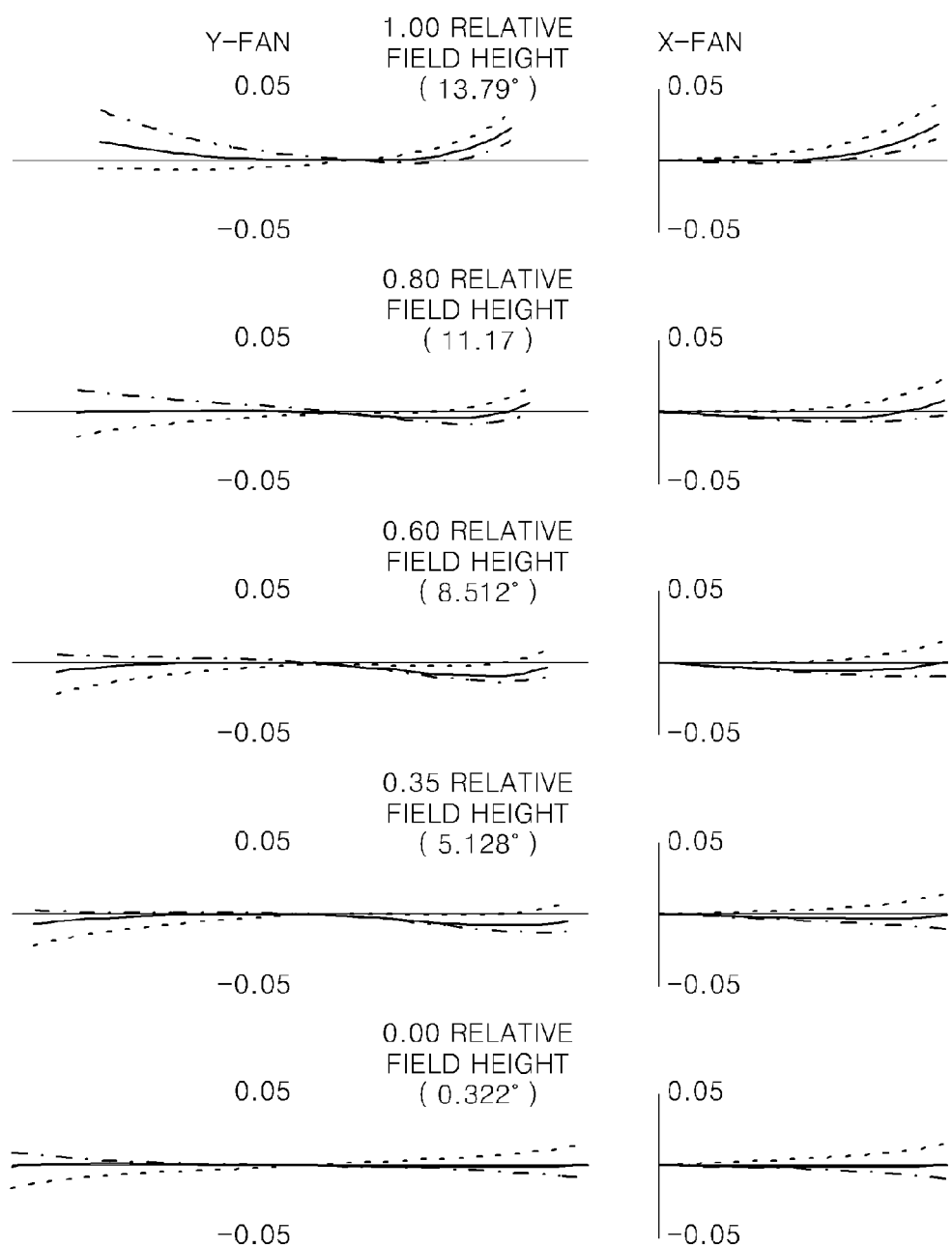
Figure 4B:
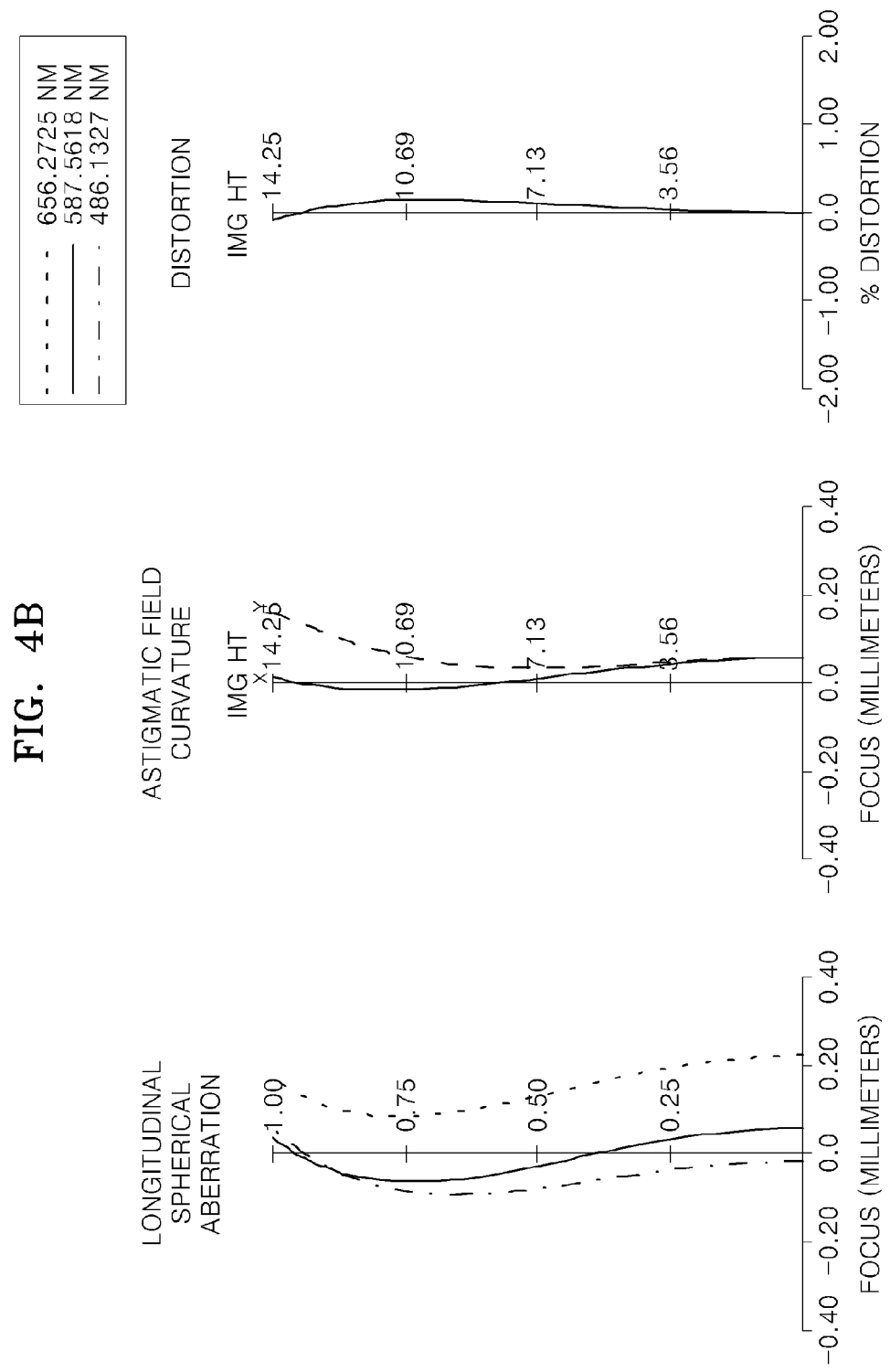
Figure 4C:
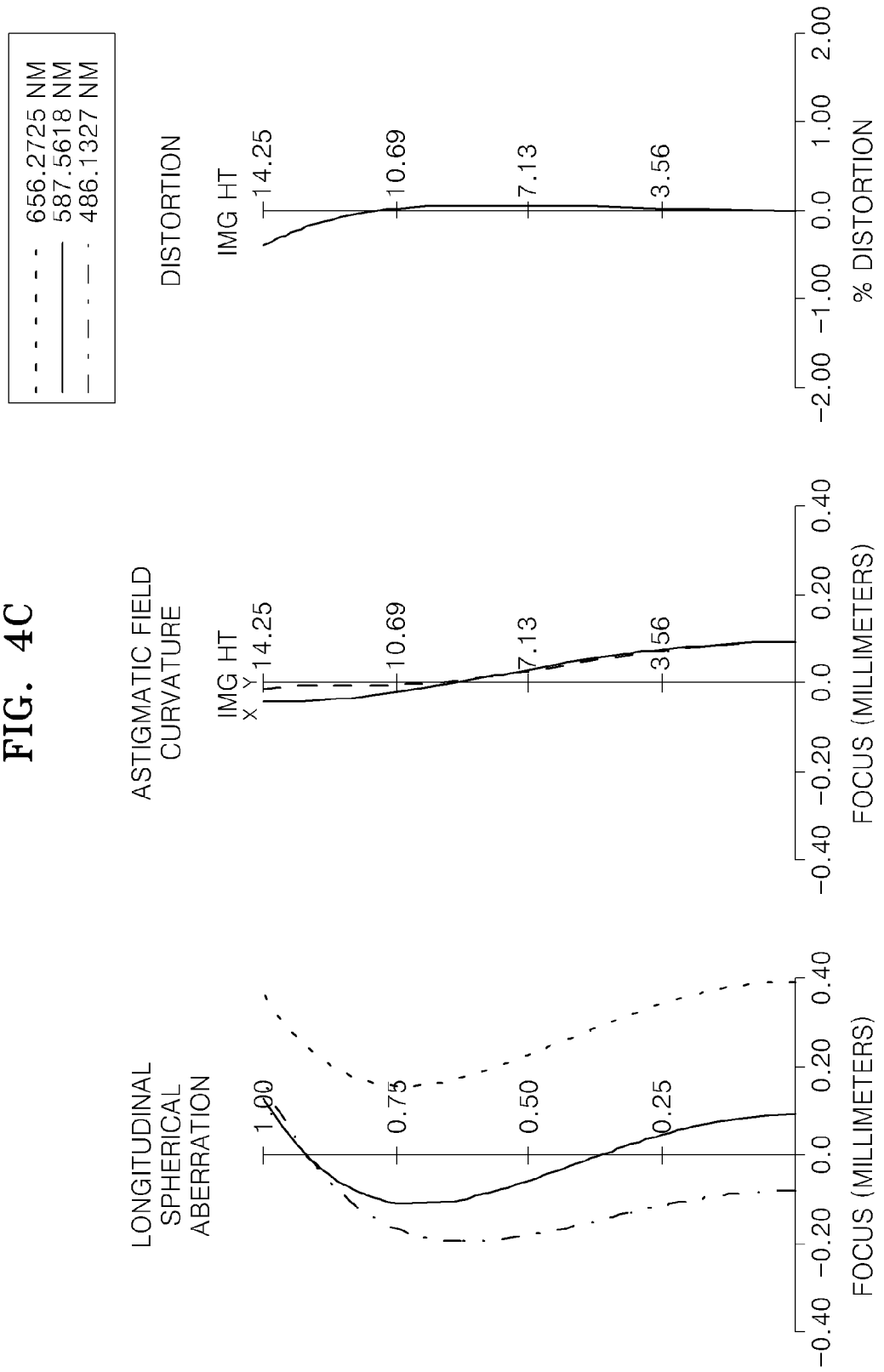

FIGS. 2A, 2B, and 2C show lateral aberration degrees of the macro lens system according to the first embodiment when the magnification is M=0.0, M=−0.5, and M=−1.0, respectively. FIGS. 3A, 3B, and 3C show the lateral aberration degrees of the macro lens system according to the first embodiment, according to locations of the 3-1 lens group. FIG. 4A shows longitudinal spherical aberration, field curvature, and distortion of the macro lens system according to the first embodiment when the magnification is M=0.0, FIG. 4B shows longitudinal spherical aberration, field curvature, and distortion of the macro lens system according to the first embodiment when the magnification is M=−0.5, and FIG. 4C shows longitudinal spherical aberration, field curvature, and distortion of the macro lens system according to the first embodiment when the magnification is M=−1.0. As astigmatic field curvature, a solid line shows sagittal field curvature (S) and a dotted line denotes tangential field curvature (T).

Second Embodiment

FIG. 5 shows a macro lens system according to the second embodiment when the magnification is M=0, M=−0.5, and M=−1.0.

The following table shows characteristics of the second embodiment. Note that in the table below under the column "Lens Surface" that the numbers correspond to the numbers in FIG. 5, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

| f = 61.9 mm, F - number = 2.87, 2ω = 25.8° | | | | |
|---|---|---|---|---|
| Lens surface | R | Dn | nd | vd |
| OBJECT | ∞ | A | | |
| 1 | 47.73 | 3 | 1.83481 | 42.7 |
| 2 | −280.551 | 0.962 | | |
| 3 | 22.871 | 3.18 | 1.83481 | 42.7 |
| 4 | 48.829 | 2.586 | | |
| 5 | 208.23 | 1 | 1.84666 | 23.8 |
| 6 | 19.084 | 2.53 | | |
| STOP | ∞ | 3.065 | | |
| 8 | −18.003 | 1 | 1.67270 | 32.2 |
| 9 | −221.377 | 3 | 1.83481 | 42.7 |
| 10 | −22.162 | 0.1 | | |
| 11 | 79.694 | 3.03 | 1.83481 | 42.7 |
| 12 | −79.694 | B | | |
| 13 | ∞ | 2.9 | 1.84666 | 23.8 |
| 14 | −18.343 | 1 | 1.80610 | 33.3 |
| 15 | 23.78 | C | | |
| 16 | 32.886 | 4.5 | 1.48749 | 70.4 |
| 17 | −263.671 | D | | |

-continued

| f = 61.9 mm, F - number = 2.87, 2ω = 25.8° | | | | |
|---|---|---|---|---|
| Lens surface | R | Dn | nd | vd |
| 18 | ∞ | 3.0 | 1.51680 | 64.2 |
| 19 | ∞ | E | | |
| IMAGE | ∞ | | | |

The following table shows a variable distance when the macro lens system according to the second embodiment performs a focusing operation, where A-E are as illustrated in FIG. 5.

| Variable distance | M = 0.0 | M = −0.5 | M = 1.0 |
|---|---|---|---|
| A | ∞ | 155.0964 | 93.6486 |
| B | 1.7774 | 12.6789 | 22.7057 |
| C | 12.1682 | 15.3633 | 19.2397 |
| D | 22.2900 | 22.2900 | 22.2900 |
| E | 0.9860 | 1.0590 | 1.0974 |

Figure 6C:
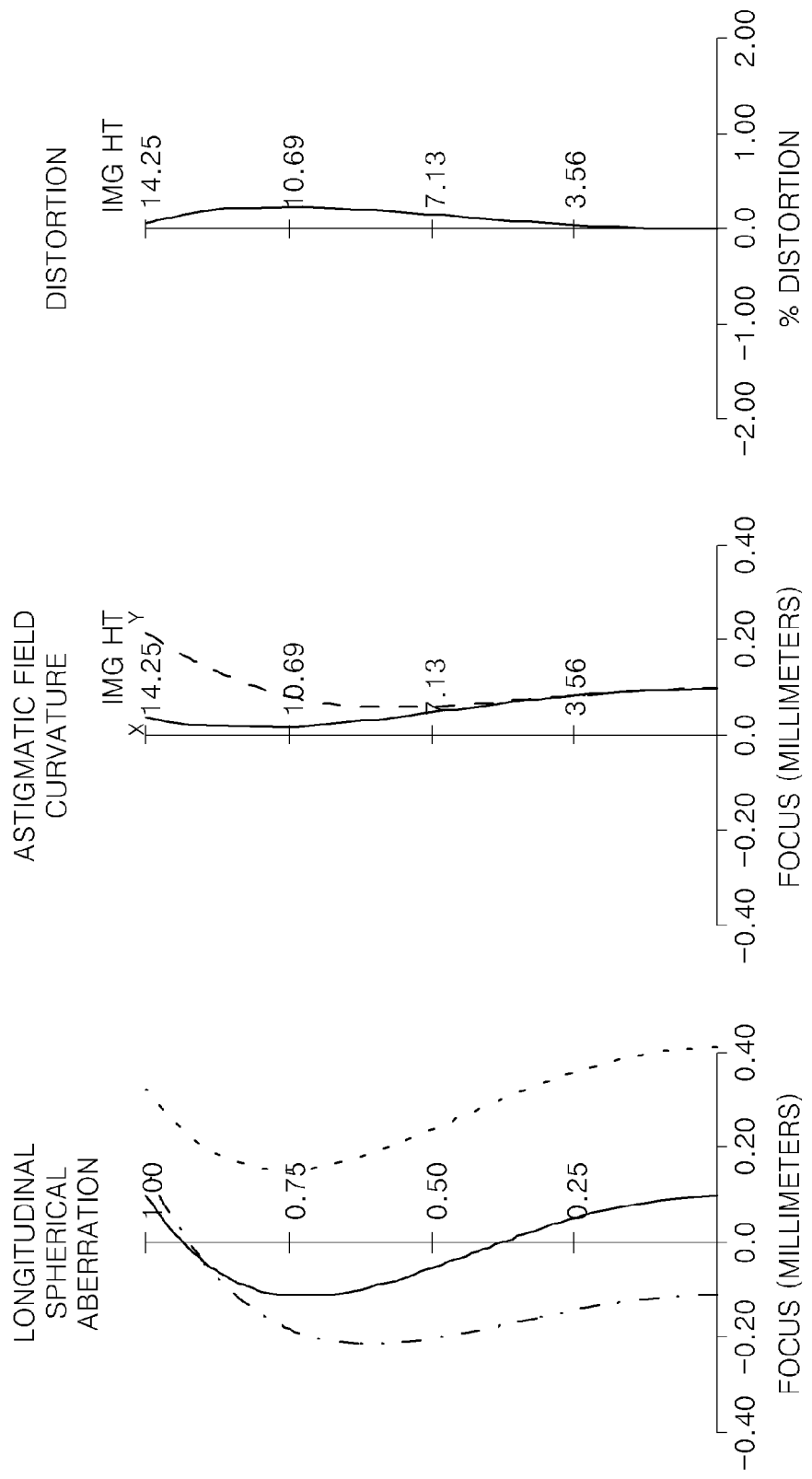

FIG. 6A shows longitudinal spherical aberration, field curvature, and distortion of the macro lens system according to the second embodiment when the magnification is M=0.0, FIG. 6B shows longitudinal spherical aberration, field curvature, and distortion of the macro lens system according to the second embodiment when the magnification is M=−0.5, and FIG. 6C shows longitudinal spherical aberration, field curvature, and distortion of the macro lens system according to the second embodiment when the magnification is M=−1.0.

Third Embodiment

FIG. 7 shows a macro lens system according to the third embodiment when the magnification is M=0, M=−0.5, and M=−1.0.

The following table shows characteristics of the third embodiment. Note that in the table below under the column "Lens Surface" that the numbers correspond to the numbers in FIG. 7, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

| f = 61.3 mm, F - number = 2.87, 2ω = 26.87° | | | | |
|---|---|---|---|---|
| Lens surface | R | Dn | nd | vd |
| OBJECT | ∞ | A | | |
| 1 | 36.675 | 3 | 1.83481 | 42.7 |
| 2 | ∞ | 0.229 | | |
| 3 | 22.914 | 3.24 | 1.83481 | 42.7 |
| 4 | 37.903 | 2.574 | | |
| 5 | 124.738 | 1 | 1.84666 | 23.8 |
| 6 | 18.412 | 2.865 | | |
| STOP | ∞ | 2.904 | | |
| 8 | −18 | 1 | 1.67270 | 32.2 |
| 9 | −135.884 | 3 | 1.83481 | 42.7 |
| 10 | −22.446 | 0.1 | | |
| 11 | 83.263 | 2.6 | 1.83481 | 42.7 |
| 12 | −83.263 | B | | |
| 13 | ∞ | 2.48 | 1.84666 | 23.8 |

-continued f = 61.3 mm, F - number = 2.87, 2ω = 26.87°

| Lens surface | R | Dn | nd | vd |
|---|---|---|---|---|
| 14 | −19.551 | 1 | 1.80610 | 33.3 |
| 15 | 24.399 | C | | |
| 16 | 30.87 | 5.21 | 1.48749 | 70.4 |
| 17 | −169.754 | D | | |
| 18 | ∞ | 3.0 | 1.51680 | 64.2 |
| 19 | ∞ | E | | |
| IMAGE | ∞ | | | |

The following table shows a variable distance when the macro lens system according to the third embodiment performs a focusing operation, where A-E are as illustrated in FIG. 7.

| Variable distance | M = 0.0 | M = −0.5 | M = 1.0 |
|---|---|---|---|
| A | ∞ | 157.8802 | 96.4411 |
| B | 2.0000 | 17.2154 | 30.5326 |
| C | 7.5605 | 13.7731 | 17.1525 |
| D | 26.7095 | 20.4969 | 17.1175 |
| E | 1.0031 | 1.0713 | 1.0965 |

FIGS. 8A, 8B, and 8C show longitudinal spherical aberrations, field curvatures, and distortions of the macro lens system according to the third embodiment when the magnification is M=0.0, M=−0.5, and M=−1.0, respectively.

Fourth Embodiment

FIG. 9 shows a macro lens system according to the fourth embodiment when the magnification is M=0, M=−0.5, and M=−1.0.

The following table shows characteristics of the fourth embodiment. Note that in the table below under the column "Lens Surface" that the numbers correspond to the numbers in FIG. 9, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

f = 59.3 mm, F - number = 2.85, 2ω = 26.97°

| Lens surface | R | Dn | nd | vd |
|---|---|---|---|---|
| OBJECT | ∞ | A | | |
| 1 | 35.703 | 3 | 1.83481 | 42.7 |
| 2 | ∞ | 0.1 | | |
| 3 | 22.282 | 3.24 | 1.83481 | 42.7 |
| 4 | 36.383 | 2.492 | | |
| 5 | 118.529 | 1 | 1.84666 | 23.8 |
| 6 | 18 | 3.5 | | |
| STOP | ∞ | 2.841 | | |
| 8 | −18 | 1 | 1.67270 | 32.2 |
| 9 | −130.189 | 3 | 1.83481 | 42.7 |
| 10 | −22.236 | 0.1 | | |
| 11 | 89.055 | 2.6 | 1.83481 | 42.7 |
| 12 | −89.055 | B | | |
| 13 | ∞ | 2.48 | 1.84666 | 23.8 |
| 14 | −21.176 | 0.106 | | |
| 15 | −20.81 | 1 | 1.80610 | 33.3 |
| 16 | 25.591 | C | | |

-continued f = 59.3 mm, F - number = 2.85, 2ω = 26.97°

| Lens surface | R | Dn | nd | vd |
|---|---|---|---|---|
| 17 | 30.808 | 4.89 | 1.48749 | 70.4 |
| 18 | −139.14 | D | | |
| 19 | ∞ | 3.0 | 1.51680 | 64.2 |
| 20 | ∞ | E | | |
| IMAGE | ∞ | | | |

The following table shows a variable distance when the macro lens system according to the fourth embodiment performs a focusing operation, where A-E are as illustrated in FIG. 9.

| Variable distance | M = 0.0 | M = −0.5 | M = 1.0 |
|---|---|---|---|
| A | ∞ | 153.9520 | 95.0000 |
| B | 1.8000 | 17.8090 | 32.3415 |
| C | 6.9467 | 11.5695 | 15.1513 |
| D | 25.3753 | 20.7525 | 17.1707 |
| E | 1.0000 | 1.0000 | 1.0000 |

Figure 10A:
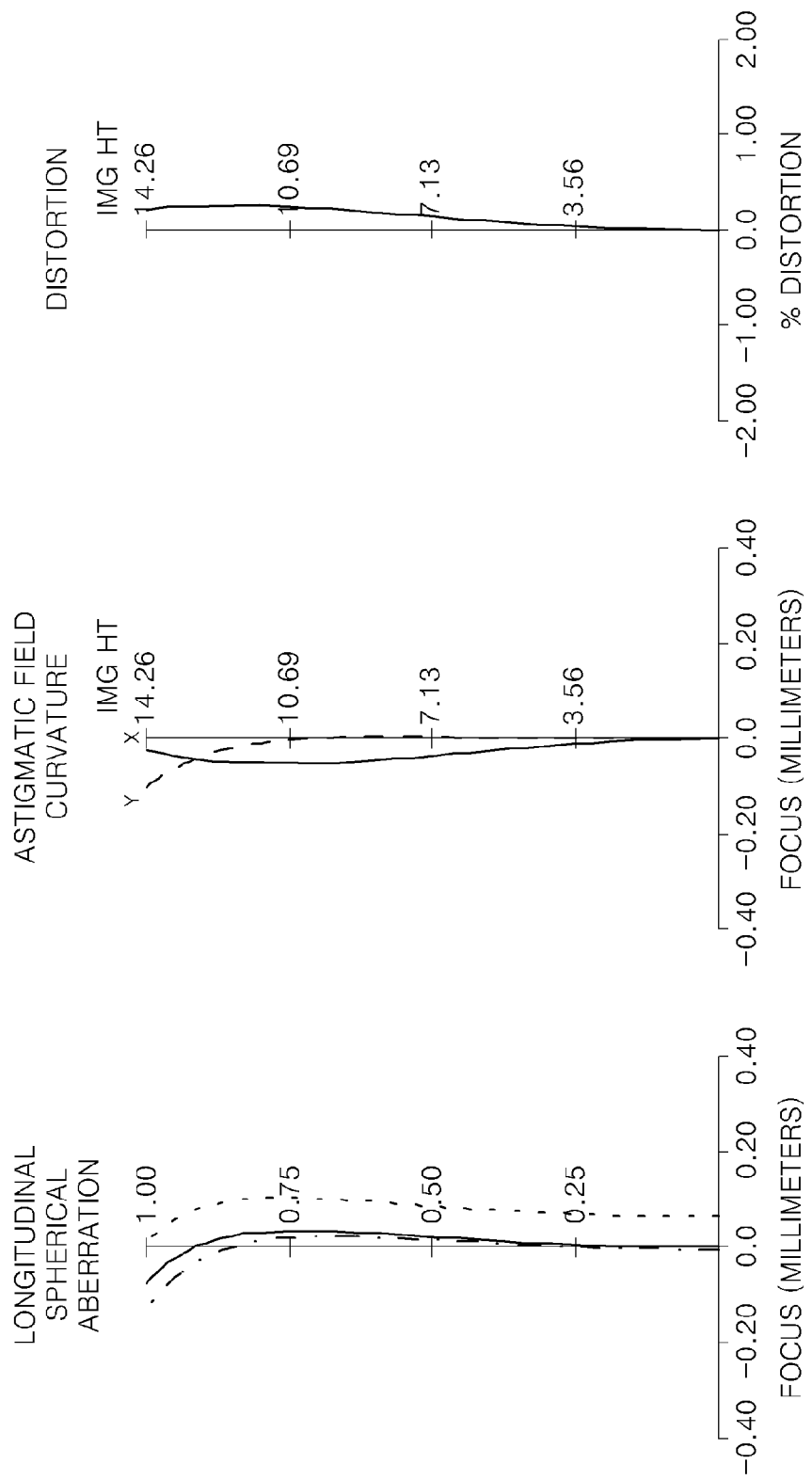
FIGS. 10A, 10B, and 10C are diagrams showing longitudinal aberrations of the macro lens system of FIG. 9.
Figure 10B:
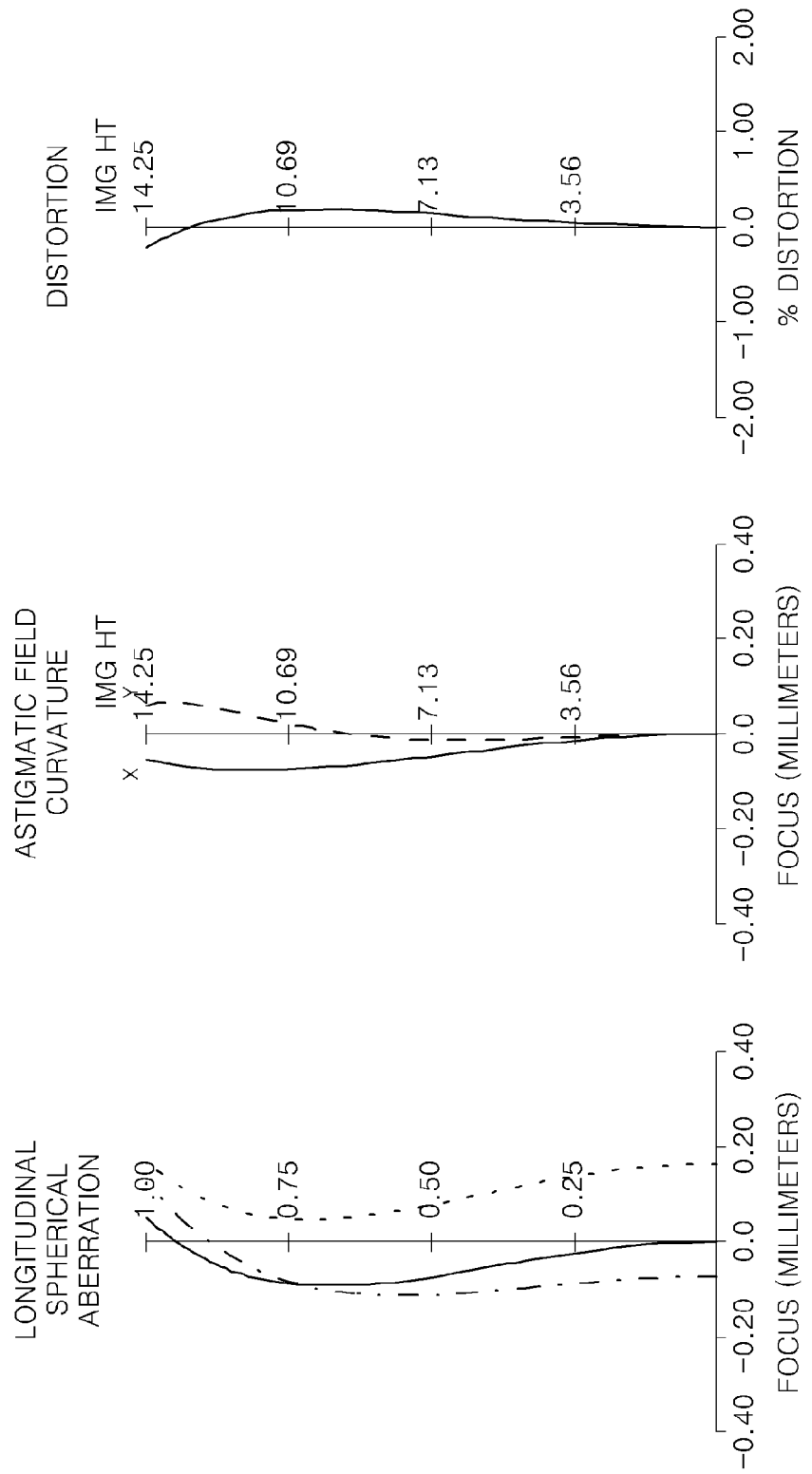
Figure 10C:
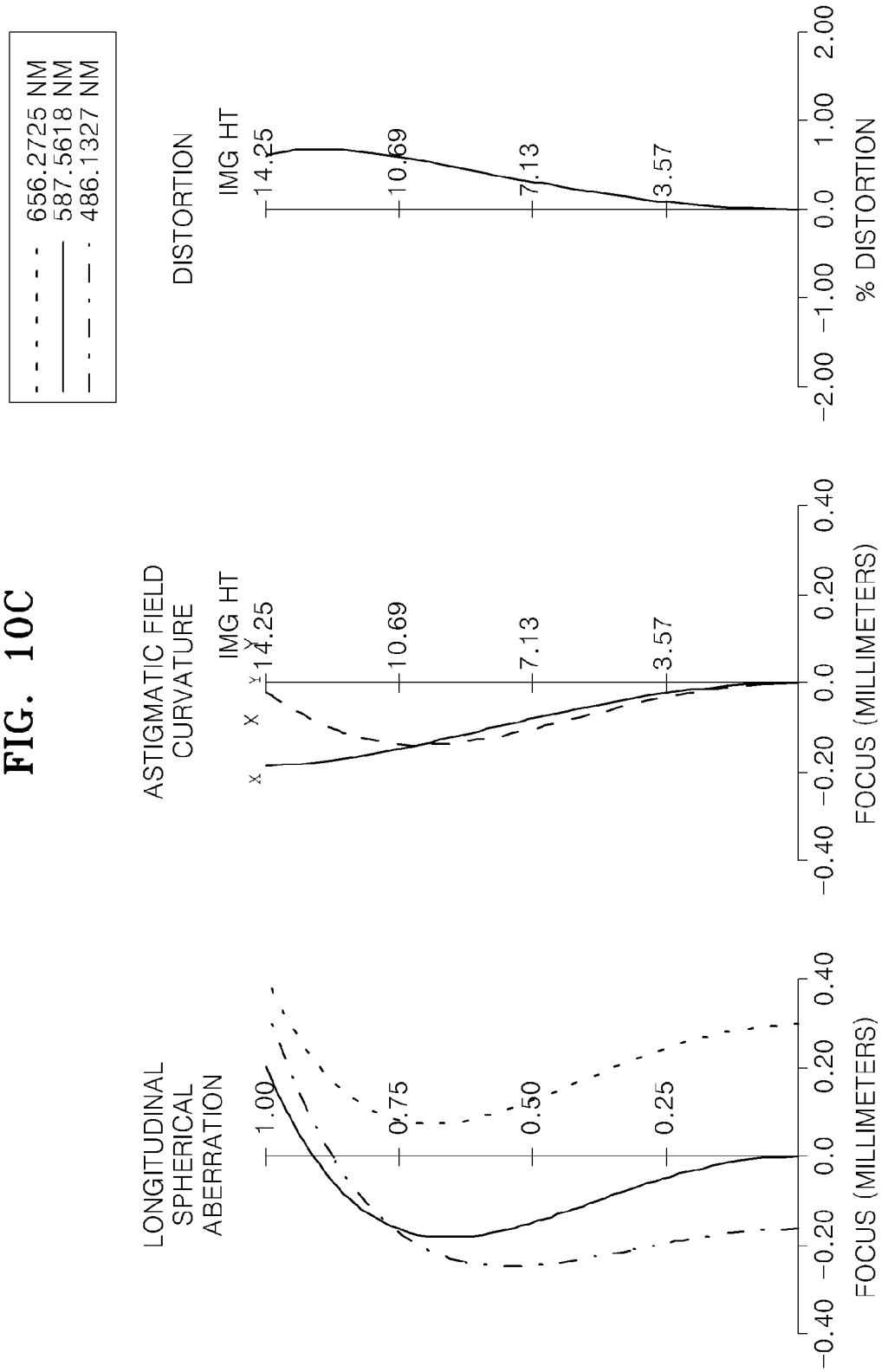

FIGS. 10A, 10B, and 10C show longitudinal spherical aberrations, field curvatures, and distortions of the macro lens system according to the fourth embodiment when the magnification is M=0.0, M=−0.5, and M=−1.0, respectively.

Fifth Embodiment

FIG. 11 shows a macro lens system according to the fifth embodiment when the magnification is M=0, M=−0.5, and M=−1.0.

The following table shows characteristics of the fifth embodiment. Note that in the table below under the column "Lens Surface" that the numbers correspond to the numbers in FIG. 11, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

f = 59.4 mm, F - number = 2.87, 2ω = 26.97°

| Lens surface | R | Dn | nd | vd |
|---|---|---|---|---|
| OBJECT | ∞ | A | | |
| 1 | 35.287 | 3 | 1.83481 | 42.7 |
| 2 | ∞ | 0.847 | | |
| 3 | 23.459 | 3.24 | 1.83481 | 42.7 |
| 4 | 51.472 | 2.236 | | |
| 5 | 321.242 | 1 | 1.84666 | 23.8 |
| 6 | 18 | 2.473 | | |
| STOP | ∞ | B | | |
| 8 | −18.473 | 1 | 1.67270 | 32.2 |
| 9 | −54.681 | 3 | 1.83481 | 42.7 |
| 10 | −21.428 | 0.1 | | |
| 11 | 89.576 | 2.6 | 1.83481 | 42.7 |
| 12 | −89.576 | C | | |
| 13 | ∞ | 2.48 | 1.84666 | 23.8 |
| 14 | −20.906 | 1 | 1.80610 | 33.3 |
| 15 | 24.997 | 10.298 | | |

-continued

| f = 59.4 mm, F - number = 2.87, 2ω = 26.97° | | | | |
|---|---|---|---|---|
| Lens surface | R | Dn | nd | vd |
| 16 | 31.471 | 4.31 | 1.48749 | 70.4 |
| 17 | −163.176 | D | | |
| 18 | ∞ | 3.0 | 1.51680 | 64.2 |
| 19 | ∞ | E | | |
| IMAGE | ∞ | | | |

The following table shows a variable distance when the macro lens system according to the fifth embodiment performs a focusing operation, where A-E are as illustrated in FIG. 11.

| Variable distance | M = 0.0 | M = −0.5 | M = 1.0 |
|---|---|---|---|
| A | ∞ | 151.0632 | 90.000 |
| B | 2.7016 | 4.5544 | 6.7567 |
| C | 2.0005 | 15.1855 | 28.9605 |
| D | 22.7180 | 22.7180 | 22.7180 |
| E | 1.0000 | 1.0000 | 1.0000 |

Figure 12B:
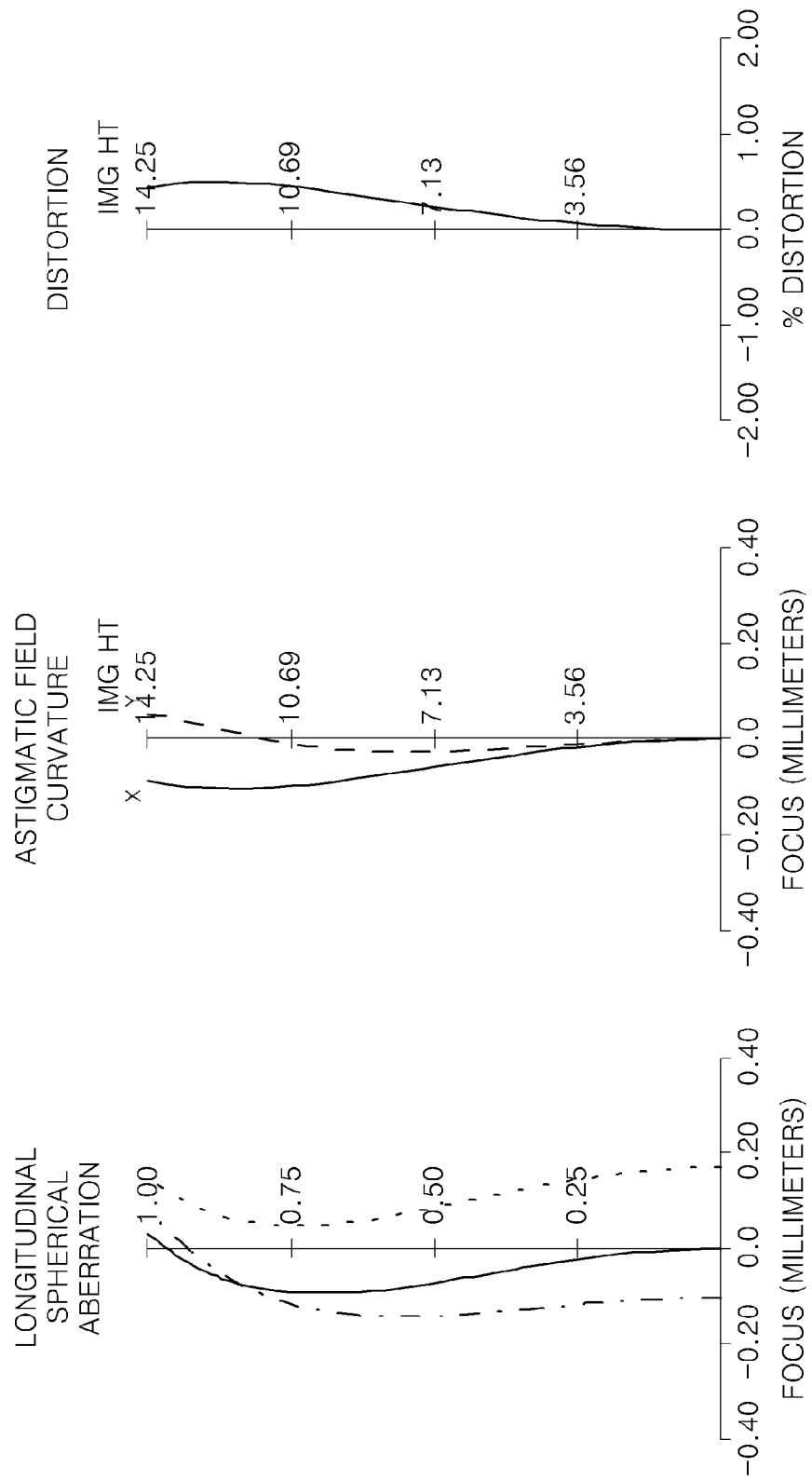
Figure 12C:
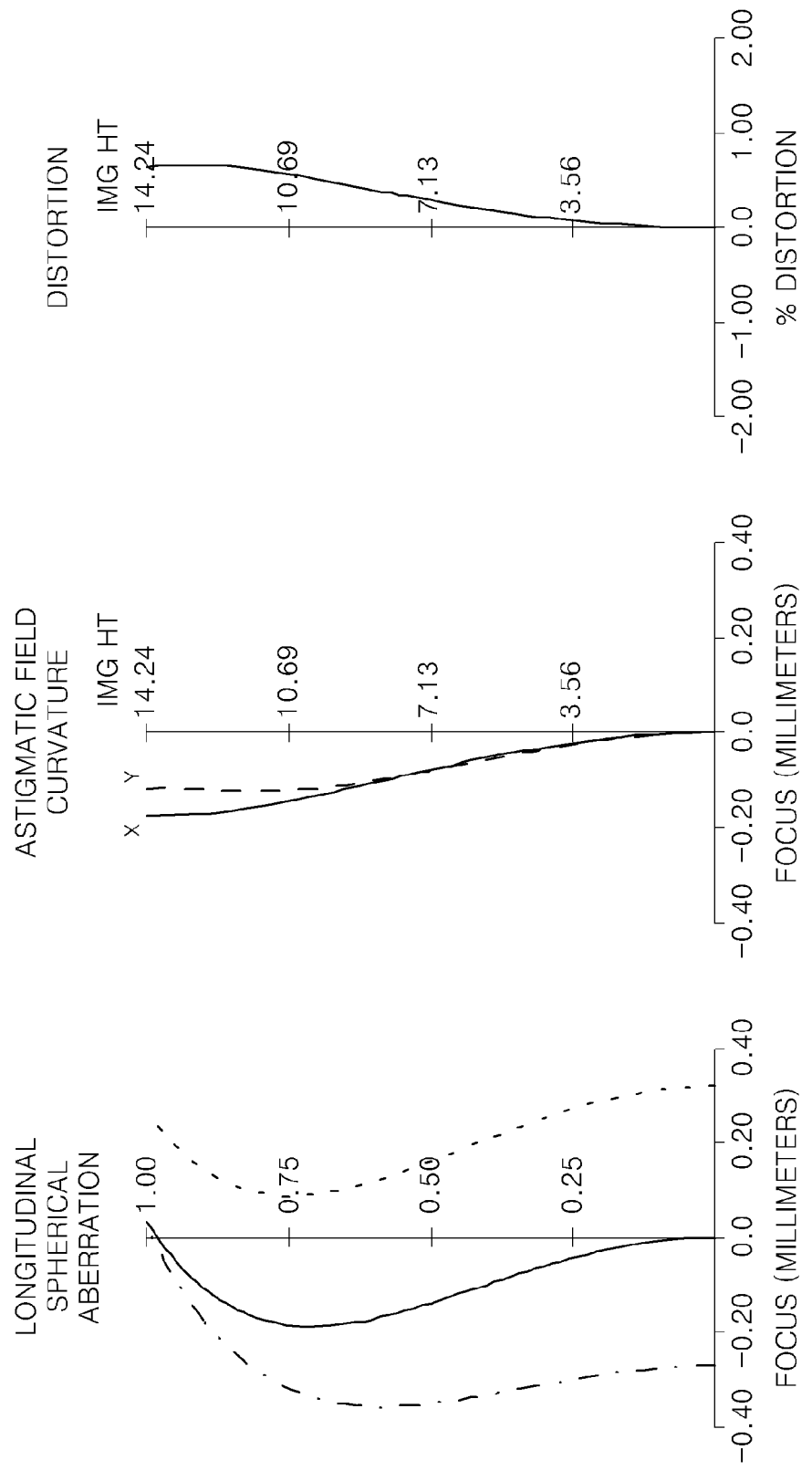

FIGS. 12A, 12B, and 12C show longitudinal spherical aberrations, field curvatures, and distortions of the macro lens system according to the fifth embodiment when the magnification is M=0.0, M=−0.5, and M=−1.0, respectively.

Sixth Embodiment

FIG. 13 shows a macro lens system according to the fifth embodiment when the magnification is M=0, M=−0.5, and M=−1.0.

The following table shows characteristics of the sixth embodiment. Note that in the table below under the column "Lens Surface" that the numbers correspond to the numbers in FIG. 13, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

| f = 61.2 mm, F - number = 2.86, 2ω = 26.22° | | | | |
|---|---|---|---|---|
| Lens surface | R | Dn | nd | vd |
| OBJECT | ∞ | A | | |
| 1 | 34.107 | 3 | 1.83481 | 42.7 |
| 2 | ∞ | 0.116 | | |
| 3 | 23.531 | 3.24 | 1.83481 | 42.7 |
| 4 | 47.539 | 2.419 | | |
| 5 | 238.648 | 1 | 1.84666 | 23.8 |
| 6 | 18 | 3.485 | | |
| STOP | ∞ | B | | |
| 8 | −20.538 | 1 | 1.67270 | 32.2 |
| 9 | −82.356 | 3 | 1.83481 | 42.7 |
| 10 | −23.747 | 0.1 | | |
| 11 | 100.681 | 2.6 | 1.83481 | 42.7 |
| 12 | −100.681 | C | | |
| 13 | ∞ | 2.48 | 1.84666 | 23.8 |
| 14 | −20.163 | 0.1 | | |
| 15 | −19.79 | 1 | 1.80610 | 33.3 |
| 16 | 25.098 | 10.905 | | |
| 17 | 30.1 | 4.57 | 1.48749 | 70.4 |
| 18 | −166.792 | D | | |

-continued

| f = 61.2 mm, F - number = 2.86, 2ω = 26.22° | | | | |
|---|---|---|---|---|
| Lens surface | R | Dn | nd | vd |
| 19 | ∞ | 3.0 | 1.51680 | 64.2 |
| 20 | ∞ | E | | |
| IMAGE | ∞ | | | |

The following table shows a variable distance when the macro lens system according to the sixth embodiment performs a focusing operation, where A-E are as illustrated in FIG. 13.

| Variable distance | M = 0.0 | M = −0.5 | M = 1.0 |
|---|---|---|---|
| A | ∞ | 157.2012 | 95.000 |
| B | 2.6219 | 3.9595 | 5.3397 |
| C | 3.4887 | 17.4947 | 31.9035 |
| D | 19.7500 | 19.7500 | 19.7500 |
| E | 1.0000 | 1.0000 | 1.0000 |

Figure 14B:
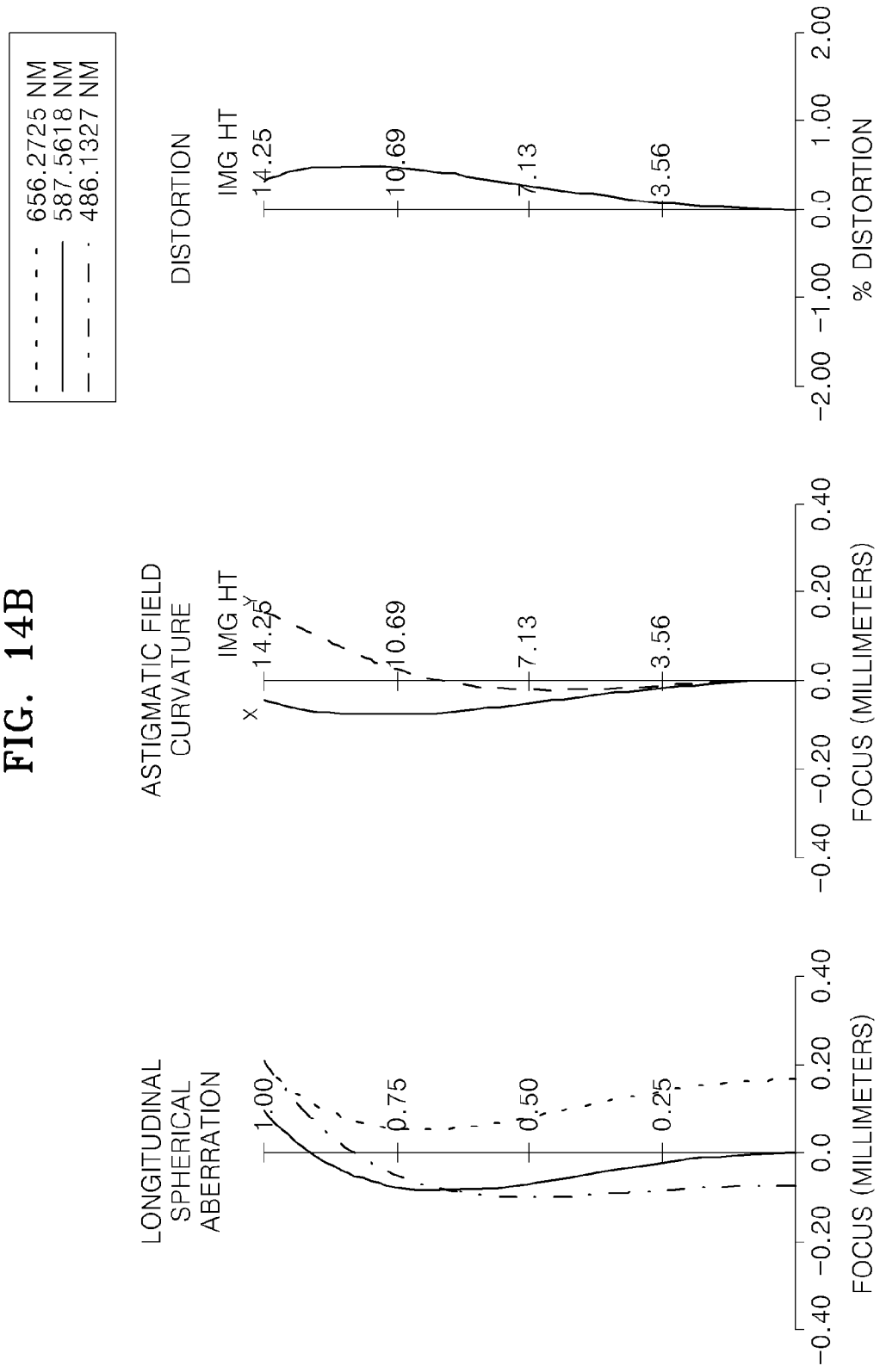
Figure 14C:
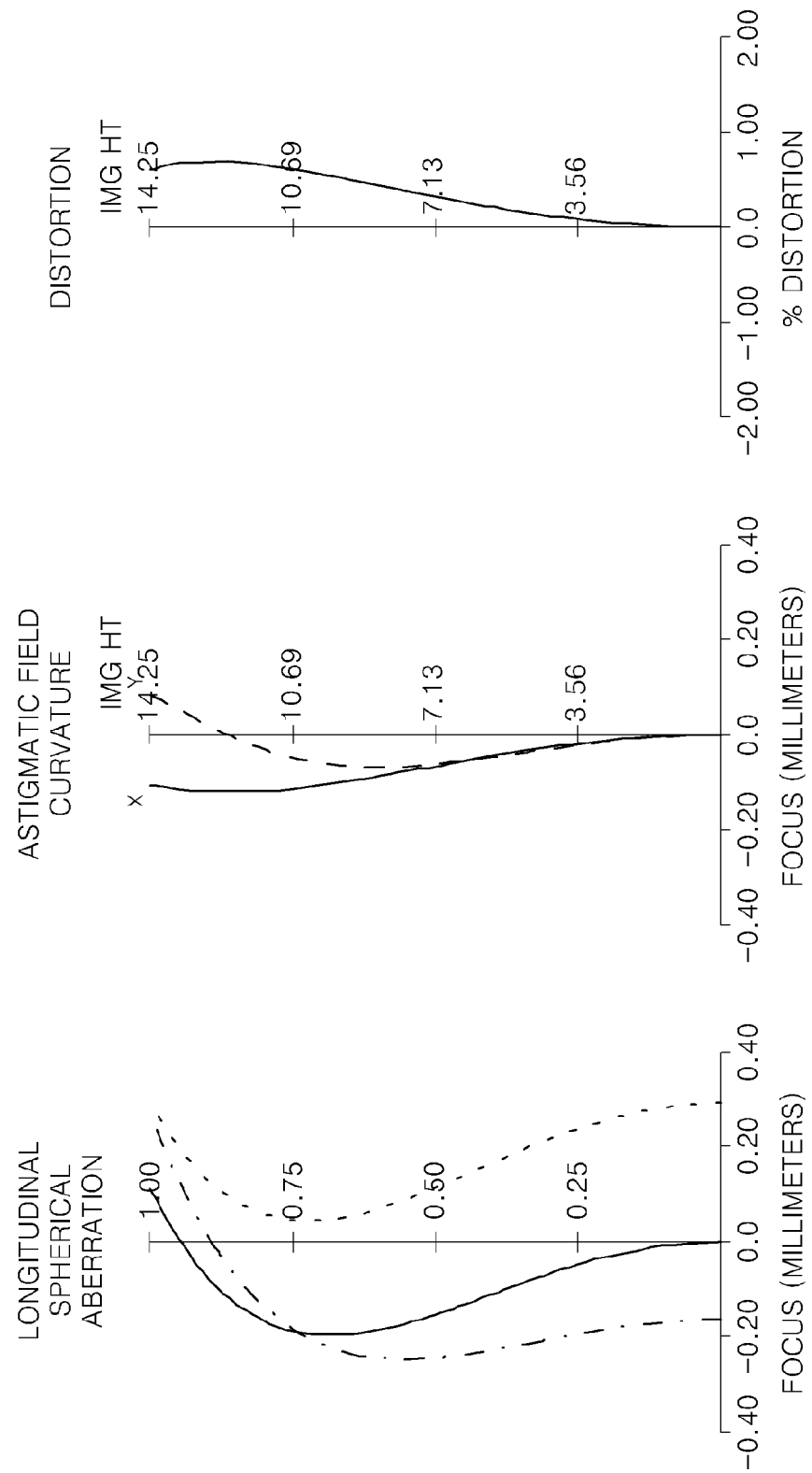

FIGS. 14A, 14B, and 14C show longitudinal spherical aberrations, field curvatures, and distortions of the macro lens system according to the sixth embodiment when the magnification is M=0.0, M=−0.5, and M=−1.0, respectively.

Seventh Embodiment

FIG. 15 shows a macro lens system according to the fifth embodiment when the magnification is M=0, M=−0.5, and M=−1.0.

The following table shows characteristics of the seventh embodiment. Note that in the table below under the column "Lens Surface" that the numbers correspond to the numbers in FIG. 15, but that numbers 2-6, 8-11, and 14 are not illustrated for clarity. The lens surface numbers 2-6 correspond to the lens surfaces between lens surface 1 and "ST" 7. The lens surface numbers 8-11 correspond to the lens surface numbers between "ST" 7 and lens surface 12. The lens surface 14 is between lens surface 13 and lens surface 15.

| f = 59.4 mm, F - number = 2.90, 2ω = 26.89° | | | | |
|---|---|---|---|---|
| Lens surface | R | Dn | nd | vd |
| OBJECT | ∞ | A | | |
| 1 | 51.072 | 3 | 1.83481 | 42.7 |
| 2 | −275.466 | 0.1 | | |
| 3 | 19.666 | 3.24 | 1.83481 | 42.7 |
| 4 | 43.933 | 2.206 | | |
| 5 | 89.399 | 1 | 1.84666 | 23.8 |
| 6 | 16.414 | B | | |
| STOP | ∞ | 2.713 | | |
| 8 | −17.592 | 1 | 1.67270 | 32.2 |
| 9 | −48.186 | 3 | 1.83481 | 42.7 |
| 10 | −20.402 | 0.1 | | |
| 11 | 102.651 | 2.6 | 1.83481 | 42.7 |
| 12 | −102.651 | C | | |
| 13 | ∞ | 2.5 | 1.84666 | 23.8 |
| 14 | −21.069 | 1 | 1.80610 | 33.3 |
| 15 | 24.73 | 8.605 | | |
| 16 | 31.344 | 4.16 | 1.48749 | 70.4 |
| 17 | −162.827 | D | | |

-continued f = 59.4 mm, F - number = 2.90, 2ω = 26.89°

| Lens surface | R | Dn | nd | vd |
|---|---|---|---|---|
| 18 | ∞ | 3.0 | 1.51680 | 64.2 |
| 19 | ∞ | E | | |
| IMAGE | ∞ | | | |

The following table shows a variable distance when the macro lens system according to the seventh embodiment performs a focusing operation, where A-E are as illustrated in FIG. 15.

| Variable distance | M = 0.0 | M = −0.5 | M = 1.0 |
|---|---|---|---|
| A | ∞ | 152.0075 | 91.1347 |
| B | 3.0479 | 5.2473 | 7.7500 |
| C | 1.9521 | 15.0892 | 28.9030 |
| D | 24.2200 | 24.2200 | 24.2200 |
| E | 1.0000 | 1.0000 | 1.0000 |

Figure 16B:
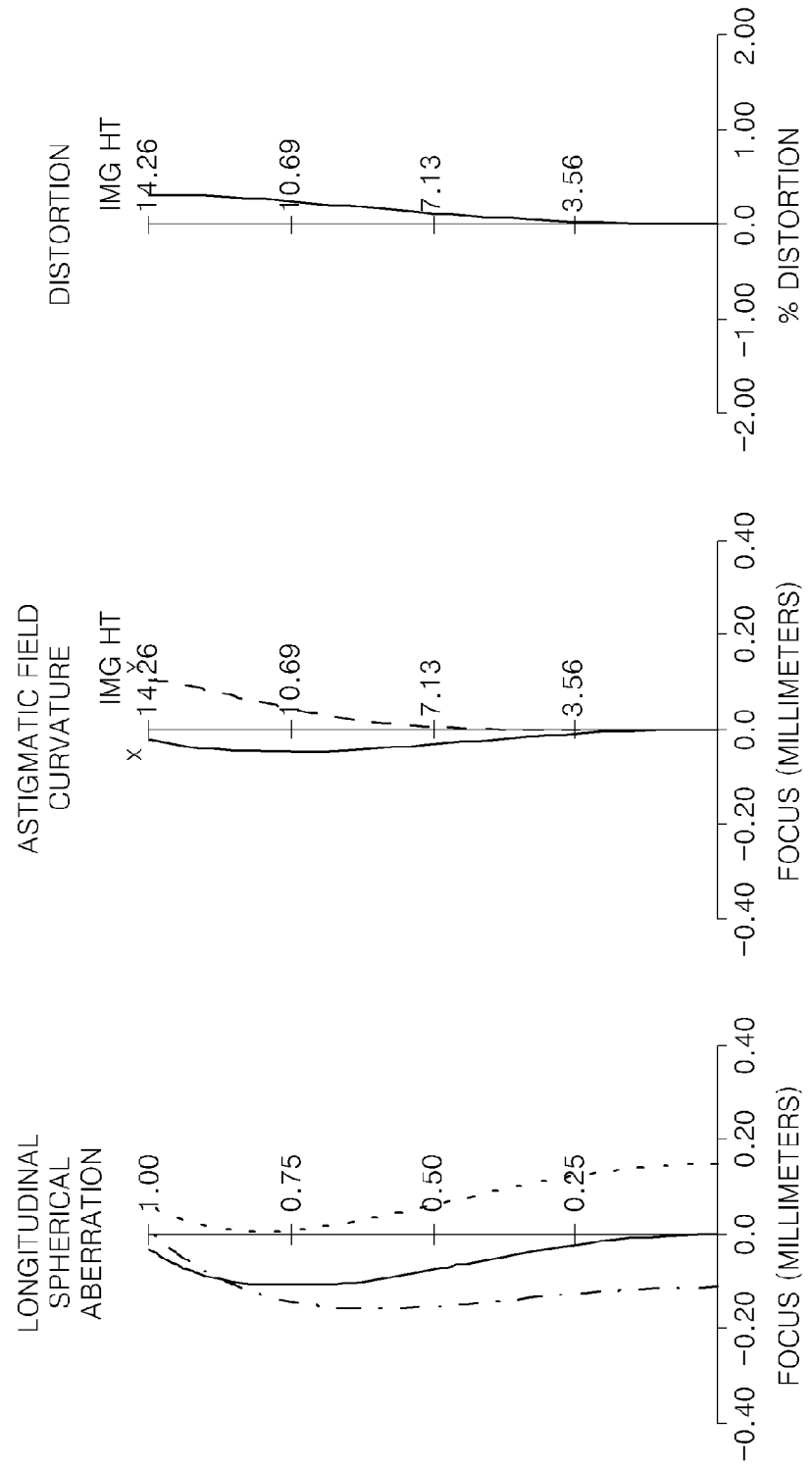
Figure 16C:
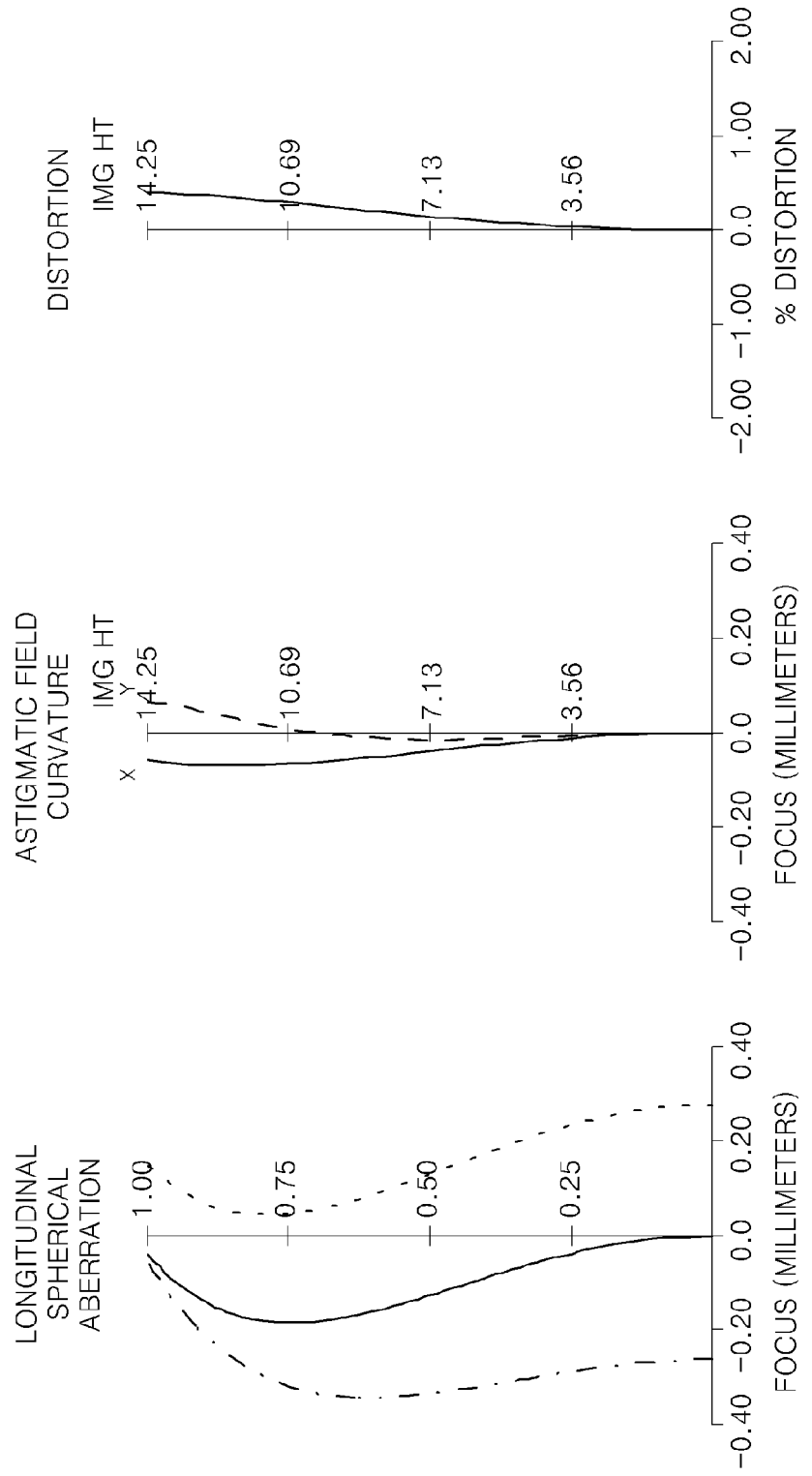

FIGS. 16A, 16B, and 16C show longitudinal spherical aberrations, field curvatures, and distortions of the macro lens system according to the seventh embodiment when the magnification is M=0.0, M=−0.5, and M=−1.0, respectively.

Equation 1 can be approximated as (A from M=−1.0)/((B+C both from M=−1.0)−(B+C both from M=0.0)), when G2 and G3 are fixed. The following table calculated from the tables above illustrate that the macro lens system according to the embodiments of the invention satisfies the above Equation 1.

| | First embodiment | Second embodiment | Third embodiment | Fourth embodiment | Fifth embodiment | Sixth embodiment | Seventh embodiment |
|---|---|---|---|---|---|---|---|
| Equation 1 | 2.92 | 2.96 | 2.98 | 2.84 | 2.72 | 2.90 | 2.80 |

The macro lens system according to the embodiments of the invention adopts the image blur correcting group in order to provide improved optical performances, and may photograph people and scenes at infinity, as well as perform macro-photographing.

Figure 17:
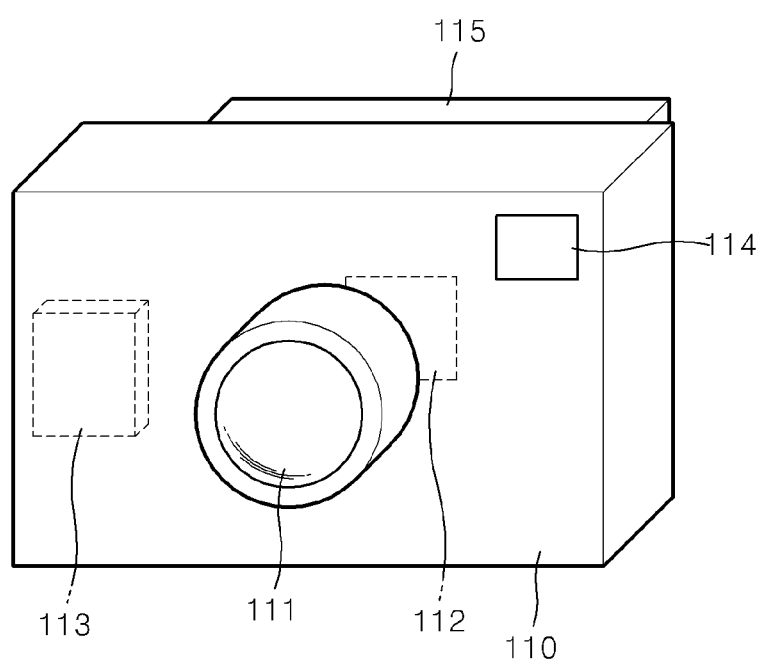
FIG. 17 is a schematic diagram of an image pickup device including a macro lens system according to an embodiment of the invention.

FIG. 17 is a diagram showing an image pickup device including the macro lens system 111 according to an embodiment of the invention. The image pickup device includes the macro lens system 111 described with reference to the previous embodiments, and an imaging device for receiving light focused by the macro lens system 111. The image pickup device may include a recording unit 113, in which information corresponding to a subject image that is photoelectrically converted by the imaging device 112 is recorded, and a view finder 114 for observing the subject image. In addition, a display unit 115 for displaying the subject image may be disposed. In the current embodiment, the view finder 114 and the display unit 115 are separately formed; however, the display unit 115 may be formed without forming the view finder 114. The image pickup device of FIG. 17 is an example, and the invention is not limited thereto, and may be applied to various optical devices besides a camera. As described above, when the macro lens system according to the invention is applied to an image pickup device such as a digital camera, an optical device that has a relatively small size with a relatively cheap price and may perform photographing with 1 magnification and is relatively bright may be obtained.

Embodiments of the invention provide a macro lens system capable of correcting an image blur.

Embodiments of the invention also provide an image pickup device including a macro lens system capable of correcting an image blur.

The term lens group means one or more lenses.

While the current general inventive concept has been particularly shown and described with reference to exemplary embodiments thereof, it will be understood by those of ordinary skill in the art that various changes in form and details may be made therein without departing from the spirit and scope of the current general inventive concept as defined by the following claims.

What is claimed is:

1. A macro lens system comprising:
a stop;
a first lens group located in front of the stop, and having a positive refractive power and configured to move during focusing;
a second lens group located behind the stop, and having a positive refractive power;
a 3-1 lens group located behind the second lens group, having a positive refractive power, and configured to move in a direction perpendicular to an optical axis to correct an image blur; and
a 3-2 lens group located behind the 3-1 lens group and having a positive refractive power for correcting a residual aberration,
wherein at least one of the following is configured to change during a focusing operation: a distance between the second lens group and the 3-1 lens group and a distance between the 3-1 lens group and the 3-2 lens group, and the macro lens system satisfies the following equation, $$2.5 \leq |\Delta l_{OBJ}/f_{OIS}| \leq 10$$

where, $\Delta l_{OBJ}$ denotes a distance from a side surface of a lens of the first lens group that is closest to an object, to the object when the lens system is in a maximum magnification of the object position, and $f_{OIS}$ denotes a distance the first lens group is moved during a focusing operation from an infinity focus position to the maximum magnification of the object position, and wherein the term lens group is used to indicate one or more lenses.

2. The macro lens system of claim 1, wherein the first lens group and the second lens group are configured to simultaneously move during focusing, the 3-1 lens group is configured to move during focusing, and the 3-2 lens group is configured not to move during focusing.

3. The macro lens system of claim 1, wherein the first lens group and the second lens group are configured to simultaneously move during focusing, the 3-2 lens group is configured to move during focusing, and the 3-1 lens group does not move during focusing.

4. The macro lens system of claim 1, wherein the first lens group and the second lens group are configured to independently move from each other during focusing, and the 3-1 lens group is configured not to move during focusing.

5. The macro lens system of claim 1, wherein the 3-1 lens group comprises a first lens and a second lens.

6. The macro lens system of claim 5, wherein the first lens has a convex surface toward an image side, and the second lens has a double-concave shape.

7. The macro lens system of claim 5, wherein the first lens and the second lens are cemented to each other in the 3-1 lens group.

8. The macro lens system of claim 1, wherein the 3-2 lens group includes one lens.

9. The macro lens system of claim 1, wherein a maximum magnification of the macro lens system is within a range of −0.5 to −1.

10. The macro lens system of claim 1, wherein a magnification of the macro lens system is within a range of 0 to −1.

11. An image pickup device comprising:
a macro lens system; and
an imaging sensor for receiving an image focused by the macro lens system,
wherein the macro lens system comprises:
a stop;
a first lens group located in front of the stop, and having a positive refractive power and configured to move during focusing;
a second lens group located behind the stop, and having a positive refractive power;
a 3-1 lens group located behind the second lens group, having a positive refractive power, and configured to move in a direction perpendicular to an optical axis to correct an image blur; and
a 3-2 lens group located behind the 3-1 lens group having a positive refractive power for correcting a residual aberration,
wherein at least one of the following is configured to change during a focusing operation: a distance between the second lens group and the 3-1 lens group and a distance between the 3-1 lens group and the 3-2 lens group, and the macro lens system satisfies the following equation, $$2.5 \leq |\Delta I_{OBJ}/f_{OIS}| \leq 10$$

where, $\Delta I_{OBJ}$ denotes a first distance from a side surface of a lens of the first lens group that is closest to an object, to the object when the lens system is in a maximum magnification of the object position, and $f_{OIS}$ denotes a second distance the first lens group is moved during a focusing operation from an infinity focus position to the maximum magnification of the object position, and wherein the term lens group is used to indicate one or more lenses.

12. The image pickup device of claim 11, wherein the first lens group and the second lens group are configured to simultaneously move during focusing, the 3-1 lens group is configured to move during focusing, and the 3-2 lens group is configured to not move during focusing.

13. The image pickup device of claim 11, wherein the first lens group and the second lens group are configured to simultaneously move, the 3-2 lens group is configured to move during focusing, and the 3-1 lens group is configured to not move during focusing.

14. The image pickup device of claim 11, wherein the first lens group and the second lens group are configured to independently move from each other during focusing, and the 3-1 lens group is configured not to move during focusing.

15. The image pickup device of claim 11, wherein the 3-1 lens group comprises a first lens and a second lens.

16. The macro lens system of claim 15, wherein the first lens has a convex surface toward an image side, and the second lens has a double-concave shape.

17. The macro lens system of claim 15, wherein the first lens and the second lens are cemented to each other in the 3-1 lens group.

18. The macro lens system of claim 11, wherein the 3-2 lens group includes one lens.

19. The macro lens system of claim 11, wherein a maximum magnification of the macro lens system is within a range of −0.5 to −1.

20. The macro lens system of claim 11, wherein a magnification of the macro lens system is within a range of 0 to −1.

* * * * *